(12) United States Patent
Sessner et al.

(10) Patent No.: US 8,177,361 B2
(45) Date of Patent: May 15, 2012

(54) SPECTACLE GLASS AND SPECTACLE LENS FOR DATA REFLECTION

(75) Inventors: Rainer Sessner, Roth (DE); Werner Mueller, Oetisheim (DE); Dietmar Uttenweiler, Icking (DE); Edda Wehner, Emmering (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 12/524,310

(22) PCT Filed: Jan. 25, 2008

(86) PCT No.: PCT/EP2008/000589
§ 371 (c)(1),
(2), (4) Date: Jan. 22, 2010

(87) PCT Pub. No.: WO2008/090000
PCT Pub. Date: Jul. 31, 2008

(65) Prior Publication Data
US 2010/0171922 A1     Jul. 8, 2010

(30) Foreign Application Priority Data

Jan. 25, 2007  (DE) .................. 10 2007 003 837

(51) Int. Cl.
*G02C 1/00*  (2006.01)
(52) U.S. Cl. ........................... 351/158; 351/175
(58) Field of Classification Search ............. 351/41, 351/158, 159, 175; 359/630, 631
See application file for complete search history.

(56) References Cited

U.S. PATENT DOCUMENTS

| | | | |
|---|---|---|---|
| 6,204,974 B1 | 3/2001 | Spitzer | |
| 6,474,808 B1 * | 11/2002 | Bettinger | 351/41 |
| 6,474,809 B2 * | 11/2002 | Tanijiri et al. | 351/41 |
| 7,800,827 B2 * | 9/2010 | Moliton et al. | 359/633 |
| 2002/0030639 A1 | 3/2002 | Shimizu et al. | |

FOREIGN PATENT DOCUMENTS

| | | |
|---|---|---|
| EP | 0 945 748 A2 | 9/1999 |
| EP | 1 536 268 A1 | 6/2005 |
| JP | 1-265223 * | 10/1989 |
| WO | WO 00/79327 A1 | 12/2000 |
| WO | WO 2006/091873 A2 | 8/2006 |

* cited by examiner

*Primary Examiner* — Huy K Mai
(74) *Attorney, Agent, or Firm* — Crowell & Moring LLP

(57) ABSTRACT

The invention relates particularly to a spectacle lens having a first and a second surface, wherein at least the first surface of the spectacle lens has a major portion zone and at least one prism zone. The major portion zone of the first surface, together with the opposing second surface of the spectacle lens, forms a major portion of the spectacle lens, which is designed for vision in at least a predetermined distance. The prism zone of the first surface, together with the opposing second surface of the spectacle lens, forms a prism portion, which is designed and arranged such that an optical image of a display is formed at a predetermined virtual distance in front of the eyes of the spectacle wearer. The invention further relates to spectacles, which comprise the spectacle lens, and to a method and apparatuses for calculating or optimizing and producing the spectacle lens.

64 Claims, 30 Drawing Sheets

SPECTACLE GLASS AND SPECTACLE LENS FOR DATA REFLECTION

BRIEF SUMMARY OF THE INVENTION

The invention relates to a spectacle lens according to claim 1, spectacles for reflecting data in and out according to claim 24, a display device according to claim 29, a method for calculating or optimizing a spectacle lens according to claim 31, a method for producing a spectacle lens according to claim 53, an apparatus for calculating or optimizing a spectacle lens according to claim 58, a computer program product according to claim 63, a storage medium according to claim 61, an apparatus for producing a spectacle lens according to claim 62, and the use of a spectacle lens according to claim 63.

It is the object of the invention to provide a spectacle lens, spectacles, as well as methods and apparatuses for calculating, optimizing and producing a spectacle lens and spectacles capable of forming, in a compact and integrated construction, a virtual image in front of the eyes of a spectacle wearer.

This object is solved by the subject matters and/or methods of the independent claims. Preferred embodiments are described in the subclaims.

1. Preferred Spectacle Lenses According to an Aspect of the Invention

According to an aspect of the invention, a spectacle lens with a first and a second surface is provided, wherein
at least the first surface of the spectacle lens has a base or major portion zone and at least one prism zone;
the major portion zone of the first surface forms a base or major portion of the spectacle lens together with the opposite second surface of the spectacle lens, which major portion is designed for vision in at least one predetermined distance; and
the prism zone of the first surface forms a prism portion together with the opposite second surface of the spectacle lens, which prism portion is designed and arranged so as to form an optical image of a display in a predetermined virtual distance in front of the eyes of the spectacle wearer.

The major portion is designed and arranged so as to achieve a predetermined dioptric power or prescription power (i.e. spherical, astigmatic and/or prismatic power) and/or a change of the dioptric power, in particular the spherical power, or an addition. At least one of the surfaces of the major portion constitutes the prescription surface of the spectacle lens, i.e. a surface calculated, optimized and fabricated depending on the individually required prescription power or prescription (spherical, cylindrical, prismatic prescription and/or addition). For example in the case of a non-astigmatic single-vision spectacle lens, the prescription surface is a spherical or rotationally symmetric aspherical surface, in the case of an astigmatic spectacle lens a toric or atoric surface, in the case of a progressive spectacle lens a progressive surface.

The prism portion is in particular designed and arranged so as to deflect light rays coming from a display in such a manner that an optical image of a display is formed in front of the eyes of a spectacle wearer at a predetermined virtual distance. The prism portion is an integral component of the spectacle lens. In addition, the prism portion is designed such that refraction data of the spectacle wearer is taken into account as well, so that the spectacle wearer can see the image formed through the prism portion sharply.

At least one of the two surfaces of the spectacle lens is a composite (complex) surface having a base or major portion zone and a prism zone, wherein the design of the object-side surface of the spectacle lens differs in the major portion zone and in the prism zone. In other words, at least one of the two surfaces of the spectacle lens is formed as a complex surface composed of the object-side surface of the major portion and the object-side surface of the prism portion. The composite, complex surface of the spectacle lens together with the second surface of the spectacle lens (which may e.g. also be a composite, complex surface or a surface extending across the prism and major portions) forms the major portion and the prism portion, respectively.

Preferably, the prism portion is arranged and designed such that, in a predetermined position of wear of the spectacle lens in front of the eyes of a spectacle wearer, at least one light ray coming from the display, after deflection on the side surface of the spectacle lens in the prism portion, is at least once reflected on the eye-side surface of the prism portion by means of total reflection in the direction of the object-side surface of the prism portion,
subsequently reflected on the object-side surface in the direction of the eye-side surface, and
imaged in the eye of the spectacle wearer through the eye-side surface of the prism portion.

After exiting through the eye-side surface, the ray passes through the pupil of the respective eye of the spectacle wearer, so that an optical image of the display is formed at a predetermined virtual distance. Alternatively, in the design of the spectacle lens, a ray may be taken into account which passes through the ocular center of rotation or through the entrance pupil of the respective eye of the spectacle wearer. An important advantage of the preferred prism portion and the preferred ray path through the prism portion is that the eye-side surface is used twice for imaging.

The spectacle lens may be located in a standardized (e.g. in DIN 58208 part 2), average position of wear in front of the eyes of the spectacle wearer. Preferably, however, an individual position of wear, i.e. an individual position of wear of the spectacle lens in front of the eyes of the spectacle wearer, is taken into account. The individual position of wear is in particular described by the pupillary distance, the corneal vertex distance, the forward inclination, the face form angle. Further parameters on the position of the wear, such as the centration data of the spectacle lens, or parameters of the eye or eyes of the spectacle wearer (such as pupillary distance) can be taken into account as well.

For example, the individual parameters may vary within the following ranges;
pupillary distance (PD) from 30 to 80 mm,
corneal vertex distance (CVD) from 3 to 50 mm,
forward inclination (FI) from −10 to +20 degrees,
face form angle (FFA) from −10 to +35 degrees.

The display may be arranged in an average or in individual position with respect to the spectacle lens as well.

For example, the display may be arranged such that the surface normal of the display and the surface normal of the side surface of the spectacle lens enclose an angle of −45° to +45°, preferably from −15° to +15°, particularly preferably 0°. The distance of the display to the side surface of the spectacle lens preferably is between 0 and 20 mm. Particularly preferably, the distance is 0 mm. In this embodiment, the display directly adjoins the side-surface, which facilitates the adjustment of the display.

Furthermore, in particular a temporary, average or individual virtual distance in front of the eyes of the spectacle wearer, in which the optical image of the display is to be formed, can be taken into account.

The prism portion may be integrated as the "near portion" in the eye-side or object-side surface of the spectacle lens.

The two portions of the spectacle lens, i.e. the prism portion and the major portion, may for example—similar to the major portion and the addition portion of a bifocal spectacle lens—be visibly demarcated from each other. A step may for example be present at the separating line or demarcating line between the prism portion and the major portion or between the prism zone and the major portion zone—like in a bifocal spectacle lens.

Preferably, however, the step is concealed in at least one direction (horizontally or vertically depending on the arrangement of the prism portion).

Preferably, the prism portion is fully concealed with the major portion, so that no step is present between the prism portion and the major portion (both in horizontal and vertical directions). In an alternative embodiment, however, a step may be present in one direction (horizontally or vertically depending on the arrangement of the prism portion) at the transition between the prism zone and the major portion zone. If the prism portion is arranged in a horizontally displaced manner from the geometric center in a nasal or temporal direction, for example, a step may be present in the vertical direction.

Preferably, in the horizontal and/or vertical direction, the first surface of the spectacle lens in the prism zone is at least once, preferably twice, continuously differentiably adjoining the first surface of the spectacle lens in the major portion zone.

In the horizontal and/or vertical direction, the first surface of the spectacle lens in the prism zone may be adjoining the first surface of the spectacle lens in the major portion zone by forming a bend or kink.

The horizontal direction is predefined in particular by the lens horizontal passing through the two permanent engravings of the spectacle lens (cf. EN ISO 13666 item 5.6). With respect thereto, the vertical direction is in particular the perpendicular direction in the tangential plane with respect to the object side surface of the spectacle lens at the centration point (cf. EN ISO 13666 item 5.2). Alternatively, the origin of the coordinate system may coincide with the geometric center of the (raw-round) spectacle lens (cf. EN ISO 13666 item 5.5), wherein optionally a predecentration of the raw-round spectacle lens may be taken into account for correction purposes.

In the prism zone, the first surface may be a simple surface, e.g. a spherical or toric surface, or a free-form surface. A free-form surface is in particular understood to be a spherical surface without point or axis symmetry.

According to a preferred embodiment, the first surface of the spectacle lens is a free-form surface in the prism zone and a spherical, rotationally symmetric aspherical, toric, atoric or progressive surface in the major portion zone.

In this preferred embodiment, the first surface of the spectacle lens in the prism zone is a complex free-form surface composed e.g. of the (virtual continuation) of the first surface in the major portion zone and a prism surface recessed therein. The first free-form surface of the spectacle lens in the prism zone is optimized and designed so as to achieve the required ray deflection of light rays from the display, wherein the required prescription power is taken into account as well in order to be able to form an image of the display as sharp and undistorted as possible. In doing so, preferably an individual position of wear of the spectacle lens, individual data of the spectacle wearer and/or an individual arrangement of the display with respect to the spectacle lens are taken into account. Alternatively, average values may be taken into account.

The first surface of the spectacle lens in the major portion zone may represent the prescription surface of the spectacle lens. Alternatively, the first surface in the major portion zone may be a predetermined spherical or rotationally symmetric aspherical surface, the bending or kinking of which may be selected and graded e.g. roughly depending on the dioptric power to be achieved and/or with respect to a cosmetic point of view (so-called blank system). In addition, the selection of the bending of the second surface may be made with respect to a production-engineering point of view.

Preferably, the maximum increase of the surface refractive power of the first surface in the horizontal and/or vertical direction is 2 D/mm, preferably 1.5 D/mm, particularly preferably 1 D/mm; and/or
the maximum increase of the surface astigmatism of the first surface in the horizontal and/or vertical direction is 1.4 D/mm, preferably 1.05 D/mm, particularly preferably 0.7 D/mm.

Further preferably, at the transition between the prism zone and the major portion zone,
the angle between the horizontal component of the surface normal of the first surface in the prism zone and the horizontal component of the surface normal of the first surface in the major portion zone is less than 5°, preferably less than 2°, particularly preferably less than 1°; and/or
the angle between the vertical component of the surface normal of the first surface in the prism zone and the vertical component of the surface normal of the first surface in the major portion zone is less than 5°, preferably less than 2°, particularly preferably less than 1°.

Preferably, the angle between the horizontal and/or vertical component of the surface normal of the first surface in the prism zone and the horizontal and/or the vertical component of the surface normal of the first surface in the major portion zone are to be kept as small as possible. In this manner, the formation of double images can be minimized in particular in the case of a bend or kink.

According to a further preferred embodiment,
As described above, the (spherical) first surface in the prism zone may be adjoining the (spherical) first surface in the major portion zone e.g. by means of a step (in the vertical and/or horizontal direction) and/or by a bend or kink. Preferably, however, the step is concealed in at least one direction (horizontally or vertically depending on the arrangement of the prism portion). The bending and the arrangement of the first surface in the prism zone are selected so as to obtain the predetermined ray deflection of the rays coming from the display.

Preferably, at the transition between the major portion zone and the prism zone,
the angle between the horizontal component of the surface normal of the first surface in the prism zone and the horizontal component of the surface normal of the first surface in the major portion zone is less than 45°, preferably less than 25°, particularly preferably less than 10°, and/or
the angle between the vertical component of the surface normal of the first surface in the prism zone and the vertical component of the surface normal of the first surface in the major portion zone is less than 45°, preferably less than 25°, particularly preferably less than 10°.

The second surface of the spectacle lens may be a spherical, rotationally symmetric aspherical, toric, atoric or progressive surface extending continuously across the major portion and the prism portion.

The second surface may e.g. be a spherical or rotationally symmetric aspherical surface. The bending or kinking of the second surface of the spectacle lens may e.g. be selected in a conventional manner roughly depending on the spherical, toric and/or prismatic power (i.e. prescription power) and/or with respect to a cosmetic point of view. The bending of the second surface may also be selected with respect to a production-engineering point of view. Alternatively, the second surface may be the prescription surface of the spectacle lens.

According to a further preferred embodiment, the second surface of the spectacle lens may have a base or major portion zone and a prism zone, similar to the first surface.

The design of the second surface in the major portion zone may vary depending on the dioptric power to be achieved. For example, the second surface of the spectacle lens may be a spherical, rotationally symmetric aspherical, toric, atoric or progressive surface.

In a preferred embodiment, the second surface in the major portion zone is a spherical or rotationally symmetric aspherical surface. As described above, the bending of the second surface of the spectacle lens in the major portion zone may for example conventionally be selected roughly depending on the spherical, toric and/or prismatic power to be achieved (i.e. prescription power) and/or with respect to a cosmetic point of view. The bending of the second surface in the major portion zone may also be selected with respect to a production-engineering point of view. In this case, the first surface of the spectacle lens in the major portion zone preferably represents the prescription surface of the spectacle lens.

Alternatively, the second surface may be the prescription surface of the spectacle lens. Preferably, in this case, the first surface is a simple spherical or rotationally symmetric aspherical surface.

In the prism zone, the second surface of the spectacle lens may be a simple surface, e.g. a spherical or toric surface, or a free-form surface.

Preferably, the second surface is a spherical surface with a first curvature in the prism zone and a spherical surface with a second curvature smaller than the first curvature in the major portion zone.

Preferably, in the horizontal and/or vertical direction, the second surface in the prism zone is at least once, preferably twice, continuously differentiably adjoining the second surface in the major portion zone.

Preferably, in the horizontal and/or vertical direction, the second surface in the prism zone is adjoining the second surface of the spectacle lens in the major portion zone by forming a bend or kink.

Preferably, the prism portion and the major portion are concealed completely, so that no step between the prism portion and the major portion is present. In an alternative embodiment, however, a step may be present in one direction (horizontally or vertically depending on the arrangement of the prism portion) at the transition between the prism zone and the major portion zone. If the prism portion is for example arranged in a horizontally displaced manner from the geometric center in the nasal or the temporal direction, a step may be present in the vertical direction.

Preferably, the prism portion is arranged in a horizontally and/or vertically displaced manner with respect to the fitting point or the geometric center of the spectacle lens, wherein the horizontal and/or vertical distance between the geometric center of the prism portion and the fitting point or the geometric center of the spectacle lens is 5 to 35 mm, preferably 10 to 20 mm, particularly preferably 15 mm.

Preferably, in a concealed prism portion, the demarcating line between the prism zone and the major portion zone of the first and optionally the second surface (or between the prism portion and the major portion) connects those surface points in which the vertex depth as a function of the coordinates (x, y) has a local extreme value (minimum or maximum), an inflection point or a jump. The geometric center of the prism portion preferably coincides with the geometric center of the rectangle circumscribing the prism portion.

Preferably, the prism portion is arranged and designed such that it lies outside the field of sight for the indirect vision in the zero direction of sight, or zero direction of gaze or straight-ahead direction. Further preferably, the prism portion is designed and arranged such that in the case of a sight deviation with respect to the zero direction of sight of 25° to 45°, preferably 30° to 35°, in the horizontal direction, and/or of up to 40°, preferably 15° to 20°, in the vertical direction the visual axis is parallel to the surface normal of the first or the second surface of the spectacle lens in the prism zone.

For example, the spectacle lens is located in front of the eyes of the spectacle wearer such that the visual ray in the zero direction of sight coincides with the fitting or centration point of the spectacle lens.

Preferably, an individual situation of wear, i.e. an individual position of wear of the spectacle lens in front of the eyes of the spectacle wearer, as well as individual parameters of the eye or the eyes of the spectacle wearer are taken into account. The individual situation of wear is in particular characterized by the pupillary distance, the corneal vertex distance, the forward inclination, the face form angle. In addition, an individual arrangement of the display with respect to the spectacle lens and/or an individual virtual distance, in which the image of the display is to be formed, may be taken into account.

Preferably, the first and/or second surface of the prism portion and/or first and/or second surface of the spectacle lens in the respective prism zone is/are calculated depending on individual parameters of the spectacle wearer.

Individual parameters of the spectacle wearer in particular comprise individual refraction data, individual parameters of the eyes of the spectacle wearer (e.g. pupillary distance, ocular center or rotation, etc.) and/or individual parameters of the position of wear of the spectacle lens in front of the eyes of the spectacle wearer (e.g. corneal vertex distance, forward inclination, face form angle, etc.), and/or individual parameters of the arrangement of the display with respect to the spectacle lens and/or an individual virtual distance in which the image of the display is to be formed, etc.

Preferably, a fully reflecting or semi-permeable reflection layer is coated on the eye-side surface in the prism zone.

Preferably, the side surface of the spectacle lens in the area of the prism portion is a plane surface.

The side surface of the spectacle lens is the surface connecting the object-side and the eye-side surfaces of the spectacle lens.

The first surface may be the eye-side surface (front surface) or the object-side surface (rear surface) of the spectacle lens.

Preferably, the eye-side surface of the spectacle lens in the major portion zone is a convex surface and the object-side surface of the spectacle lens in the major portion zone is a concave surface, so that the major portion has a meniscus shape. Also, the prism portion preferably has a meniscus shape, i.e. the eye-side surface of the spectacle lens in the prism zone is a concave surface and the object side surface of the spectacle lens in the prism zone is a convex surface.

2. Preferred Spectacles According to a Further Aspect of the Invention

According to a further aspect of the invention, spectacles for coupling data in and out are provided, which have at least one preferred spectacle lens according to the invention.

Preferably, the spectacles comprise at least one display arranged and designed such that, in a predetermined position of wear of the spectacle lens in front of the eyes of a spectacle wearer, at least one light ray coming from the display, after deflection on the side surface of the spectacle lens in the prism portion, is at least once reflected on the eye-side surface of the prism portion by means of total reflection in the direction of the object-side surface of the prism portion, subsequently reflected on the object-side surface in the direction of the eye-side surface, and imaged in the eye of the spectacle wearer through the eye-side surface of the prism portion.

Preferably, the display is integrated in a spectacle frame, preferably in a spectacle ear piece or in a bridge portion of the spectacle frame.

Preferably, the spectacles further comprise a power source preferably integrated in the spectacle frame; and/or a driving device for driving the display, wherein the driving device is preferably integrated in the spectacle frame.

The driving device may particularly be designed to receive information or data to be displayed on the display from an external device. The data may be transmitted to the driving device via a cable in a wired manner. Preferably however, the data to be displayed is transmitted to the driving device for example via radio technology (e.g. WLAN, Bluetooth, GSM, UMTS, etc.) in a wireless manner. The transmitted data may be displayed on the display together with additional data generated by the driving device itself or stored therein. For example, the heart rate may be transmitted from a pulse monitor, which is carried by the spectacle wearer, to the driving device in a wireless manner. In addition, route information received and generated by a GPS system could be transmitted to the driving device for example in a wireless manner.

Preferably, the spectacles are an autarkic system. In this case, an autarkic system is understood to be a system in which all components are integrated in the spectacle lenses and in the frame, so that no cable connections to systems external to the spectacles are present. Optionally, merely a radio connection to a data transmission device may be established.

The face form angle of the spectacle lens may preferably assume values from 0° to 35°.

3. Preferred Display Apparatus According to a Further Aspect of the Invention

According to a further aspect of the invention, a display apparatus is provided which comprises spectacles with at least a preferred inventive spectacle lens and a display arranged in the spectacle frame of the spectacles.

Preferably, the display apparatus further comprises a power source preferably integrated in the spectacle frame; and/or a driving device for driving the display, wherein the driving device is preferably integrated in the spectacle frame.

4. Preferred Method for Calculating or Optimizing a Spectacle Lens According to a Further Aspect of the Invention According to a further aspect of the invention, a computer-implemented method for calculating or optimizing a spectacle lens is provided, wherein the method comprises a calculating or optimizing step of at least a first surface of the spectacle lens, wherein the calculating or optimizing step is performed such that the first surface has a base or major portion zone and a prism zone, the major portion zone of the first surface forms a base or major portion of the spectacle lens together with an opposite second surface of the spectacle lens, which major portion is designed for vision in at least one predetermined distance; and the prism zone of the first surface forms a prism portion together with the opposite second surface of the spectacle lens, which prism portion is designed and arranged so as to form an optical image of a display in a predetermined virtual distance in front of the eyes of the spectacle wearer.

The major portion is designed and arranged so as to achieve a predetermined dioptric power or prescription power (i.e. spherical, astigmatic and/or prismatic power) and optionally a change of the dioptric power, in particular the spherical power, or an addition. The prism portion is designed and arranged so as to achieve a predetermined deflection of the rays coming from the display, so that an optical image of a display is formed at a predetermined virtual distance in front of the eyes of the spectacle wearer.

Preferably, the calculation or optimization of the first and the second surface of the spectacle lens in the prism zone is performed such that, in a predetermined position of wear of the spectacle lens in front of the eyes of a spectacle wearer, at least one light ray coming from the display, after deflection on the side surface of the spectacle lens in the prism portion, is at least once reflected on the eye-side surface of the prism portion by means of total reflection in the direction of the object-side surface of the prism portion, subsequently reflected on the object-side surface in the direction of the eye-side surface, and imaged in the eye of the spectacle wearer through the eye-side surface of the prism portion.

Preferably, the calculating or optimizing step is performed taking individual data of the spectacle wearer into account.

Preferably, the method further comprises a step of obtaining target data of the spectacle lens, wherein the target data of the spectacle lens comprises data relating to the to-be-obtained dioptric power or prescription power of the major portion and/or data relating to a required ray deflection of the light rays coming from the display.

Moreover, the target data may comprise data relating to an individual position of wear of the spectacle lens in front of the eyes of the spectacle wearer and/or data relating to the arrangement of the display with respect to the spectacle lens. The position of wear is in particular characterized by the corneal vertex distance or the ocular center of rotation, pupillary distance, forward inclination, face form angle, and/or object model, etc.

The data relating to the required ray deflection through the prism portion may be determined for example on the basis of a predefined average or to-be-determined individual arrangement of the display with respect to the spectacle lens. In doing so, a predefined average or an individual virtual distance in front of the eyes of the spectacle wearer, in which the optical image of the display is to be formed, can be taken into account.

Preferably, the first surface is calculated and optimized such that in the horizontal and/or vertical direction, the first surface in the prism zone is at least once, preferably twice, continuously differentiably adjoining the first surface in the major portion zone.

Preferably, the first surface is calculated and optimized such that in the horizontal and/or vertical direction, the first surface in the prism zone is adjoining the first surface in the major portion zone by forming a bend or kink.

Preferably, the first surface is a free-form surface in the prism zone and a spherical, rotationally symmetric aspherical, toric, atoric or progressive surface in the major portion zone.

Preferably, the first surface is calculated and optimized such that the maximum increase in the surface refractive power of the first surface in the horizontal and/or vertical direction is 2 D/mm, preferably 1.5 D/mm, particularly preferably 1 D/mm; and/or the maximum increase in the surface astigmatism of the first surface in the horizontal and/or vertical direction is 1.4 D/mm, preferably 1.05 D/mm, particularly preferably 0.7 D/mm.

Preferably, the first surface is calculated and optimized such that the angle between the horizontal component of the surface normal of the first surface in the prism zone and the horizontal component of the surface normal of the first surface in the major portion zone is less than 5°, preferably less than 2°, particularly preferably less than 1°; and/or the angle between the vertical component of the surface normal of the first surface in the prism zone and the vertical component of the surface normal of the first surface in the major portion zone is less than 5°, preferably less than 2°, particularly preferably less than 1°.

Preferably, the first surface is a spherical surface in the prism zone and a spherical, rotationally symmetric aspherical, toric, atoric or progressive surface in the major portion zone.

Preferably, the first surface is a spherical surface with a first curvature in the prism zone and a spherical surface with a second curvature smaller than the first curvature in the major portion zone.

Preferably, the first surface is calculated and optimized such that at the transition between the major portion zone and the prism zone, the angle between the horizontal component of the surface normal of the first surface in the prism zone and the horizontal component of the surface normal of the first surface in the major portion zone is less than 45°, preferably less than 25°, particularly preferably less than 10°, and/or the angle between the vertical component of the surface normal of the first surface in the prism zone and the vertical component of the surface normal of the first surface in the major portion zone is less than 45°, preferably less than 25°, particularly preferably less than 10°.

Preferably, the method further comprises a step of calculating or optimizing the second surface of the spectacle lens, wherein the optimization is preferably performed taking individual data of the spectacle wearer into account.

The second surface of the spectacle lens may be a spherical, rotationally symmetric aspherical, toric, atoric or progressive surface continuously extending across the major portion and the prism portion.

Alternatively, the second surface may have a base or major portion zone and at least one prism zone—similar to the first surface. In the prism zone, the second surface may be a free—form surface or a simple surface, e.g. a spherical or toric surface. In the major portion zone, the second surface may be a spherical, rotationally symmetric aspherical, toric, atoric or progressive surface.

According to a preferred embodiment, the second surface of the spectacle lens is a spherical surface with a first curvature in the prism zone and a spherical surface with a second curvature smaller than the first curvature in the major portion zone.

Preferably, the second surface is calculated such that in the horizontal and/or the vertical direction, the second surface in the prism zone is at least once, preferably twice, continuously differentiably adjoining the second surface in the major portion zone.

Preferably, the second surface in the prism zone is calculated such that in the horizontal and/or vertical direction, the second surface in the prism zone is adjoining the second surface in the major portion zone by forming a bend or kink.

Preferably, the prism portion and the major portion are fully concealed, so that no step between the prism portion and the major portion is present. In an alternative embodiment, however, a step may be present at the transition between the prism zone and the major portion zone in one direction (horizontally or vertically depending on the prism portion). If the prism portion is for example arranged in a displaced manner from the geometric center in the nasal or temporal direction, a step may be present in the vertical direction.

Preferably, the prism portion is arranged in a horizontal and/or vertical manner with respect to the fitting point or the geometric center of the spectacle lens.

Preferably, the first and optionally the second surface of the spectacle lens is/are calculated and optimized such that in a predetermined position of wear of the spectacle lens the prism portion is outside the field of sight of a spectacle wearer in indirect vision in the zero direction of sight; and upon a sight deviation, or gaze deviation or eye excursion, at a predetermined angle from 25° to 45°, preferably 30° to 35°, in the horizontal direction, and/or of up to 40°, preferably 15° to 20°, in the vertical direction, the visual axis is parallel to the first or the second surface of the spectacle lens in the prism zone.

Preferably, the prism portion is arranged in a horizontally and/or vertically displaced manner with respect to the fitting point or the geometric center of the spectacle lens, wherein the horizontal and/or vertical distance between the geometric center of the prism portion and the fitting point or the geometric center of the spectacle lens is 5 to 35 mm, preferably 10 to 20 mm, particularly preferably 15 mm.

5. Preferred Method for Producing a Spectacle Lens According to a Further Aspect of the Invention According to a further aspect of the invention, a method for producing a spectacle lens is provided, the method comprising the following steps;

providing surface data of the spectacle lens, wherein the spectacle lens is calculated and optimized according to the mentioned preferred method according to the invention;

fabricating the spectacle lens according to the provided surface data of the spectacle lens.

The machining may be performed by means of numerically controlled CNC machines or by means of a casting method or a combination of the two methods.

Preferably, the method comprises a step of applying a preferably semi-permeable reflection layer to the eye-side surface of the spectacle lens in the area of the prism portion.

Preferably, the fabrication of the spectacle lens comprises the following steps;

providing a base or major body, providing a prism body connecting the main body and the prism body;

finishing the main body with the connected prism body, so that the spectacle lens has the determined target data, wherein the target data of the spectacle lens comprises data relating to the to-be-obtained dioptric power or prescription power of the major portion and/or data relating to a required ray deflection of the light rays coming from the display.

Preferably, the connection of the prism body with the main body is achieved by melting or gluing in.

Preferably, the main body is provided with a recess for receiving the prism body.

6. Preferred Apparatus for Calculating or Optimizing a Spectacle Lens According to a Further Aspect of the Invention According to a further aspect of the invention, an apparatus for calculating or optimizing a spectacle lens is provided, wherein the apparatus comprises
calculating or optimizing means for calculating or optimizing at least one surface of the spectacle lens, wherein the calculating or optimizing means are designed and arranged so as to perform the method for calculating or optimizing the spectacle lens according to one of the preferred methods according to the invention.

Preferably, the apparatus further comprises obtaining means for obtaining target data of the spectacle lens, wherein the target data of the spectacle lens comprises data relating to the to-be-obtained dioptric power or prescription power of the major portion and/or data relating to the required ray deflection of the light rays coming from the display.

7. Preferred Computer Program Product According to a Further Aspect of the Invention According to a further aspect of the invention, a computer program product is provided, having program portions that are adapted, when loaded and executed on a computer, to perform a preferred method for calculating or optimizing a spectacle lens according to the invention.

8. Preferred Storage Medium with a Computer Program Stored Thereon, According to a Further Aspect of the Invention According to a further aspect of the invention, a storage medium with a computer program stored thereon is provided, wherein the computer program is adapted, when loaded and executed on a computer, to perform a preferred method for optimizing a spectacle lens according to the invention.

9. Preferred Apparatus for Fabricating a Spectacle Lens According to a Further Aspect of the Invention According to a further aspect of the invention, an apparatus for producing a spectacle lens is provided, comprising
calculating or optimizing means for calculating or optimizing at least one surface of the spectacle lens, wherein the calculating or optimizing means are designed and arranged so as to perform a preferred method for calculating or optimizing the spectacle lens according to the invention.
machining means for machining the optimized spectacle lens.

The machining means may comprise e.g. numerical controlled CNC machines, means for performing a casting method or other suitable means for machining the calculated and optimized spectacle lens.

10. Preferred Use of a Spectacle Lens According to a Further Aspect of the Invention According to a further aspect of the invention, a use of a preferred spectacle lens according to the invention in a predetermined average or (individually determined) individual position of wear of the spectacle lens in front of the eyes of a spectacle wearer for coupling data in and/or out is provided.

Preferably, the use of spectacles takes place in a predetermined average or individual position of wear of the spectacle lens in front of the eyes of the spectacle wearer, for coupling data in and/or out.

The position of wear is in particular characterized by the corneal vertex distance or ocular center of rotation distance, pupillary distance, forward inclination and/or face form angle, object model or object distance, etc. Furthermore, the position of wear comprises data relating to the arrangement and optionally the size of the display as well as optionally the virtual distance in front of the eyes of the spectacle wearer, in which the optical image of the display is to be formed.

Preferred embodiments of the mentioned aspects are exemplarily described in the following on the basis of drawings.

BRIEF DESCRIPTION OF THE DRAWINGS

The figures show:
FIGS. 3(a-b) a spectacle lens with an integrated prism portion according to a second embodiment of preferred spectacles according to the invention;
FIGS. 4(a-b) spectacles with a spectacle lens with integrated temporally displaced prism portion according to the second embodiment of preferred spectacles according to the invention;
FIGS. 6(a-b) schematic view of a spectacle wearer wearing spectacles according to a preferred embodiment of the invention, which spectacles have a spectacle lens with temporally displaced, integrated prism portion;
FIG. 6b top view;
FIGS. 7(a-d) different views of a spectacle lens with integrated prism according to the second embodiment;
FIG. 7a top view;
FIGS. 19(a-b) spectacles with a spectacle lens with integrated prism portion according to the third embodiment;
FIG. 19b top view in the position of wear of the spectacles;
FIGS. 21(a-c) spectacles with a spectacle lens with integrated prism portion according to a fourth embodiment of a preferred embodiment of the invention;

FIG. 21c top view and ray path through the prism portion in the position of wear of the spectacle lens;

FIG. 24b shows an enlarged view of the portion "Z" in FIG. 24a;

DETAILED DESCRIPTION

Figure 1:
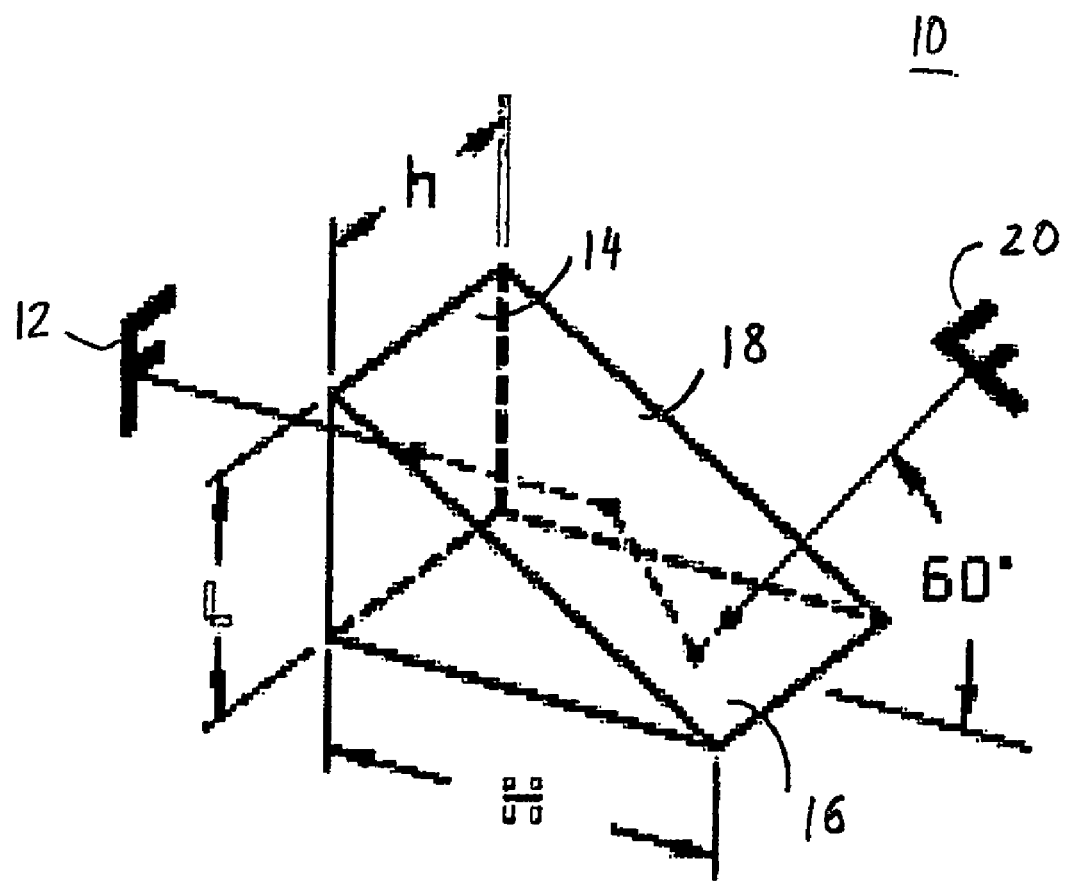
FIG. 1 a ray path through a (Bauernfeind) prism.

FIG. 1 shows the ray path through a prism 10, e.g. through a so-called Bauernfeind prism. A light ray coming from the object 12 enters through the side or entrance surface 14 of the prism, is reflected at the reflection surface 16 into the direction of the exit surface 18 and exits through the exit surface 18, so that an image 20 of the object 12 is formed in a predetermined virtual distance.

Figure 2:
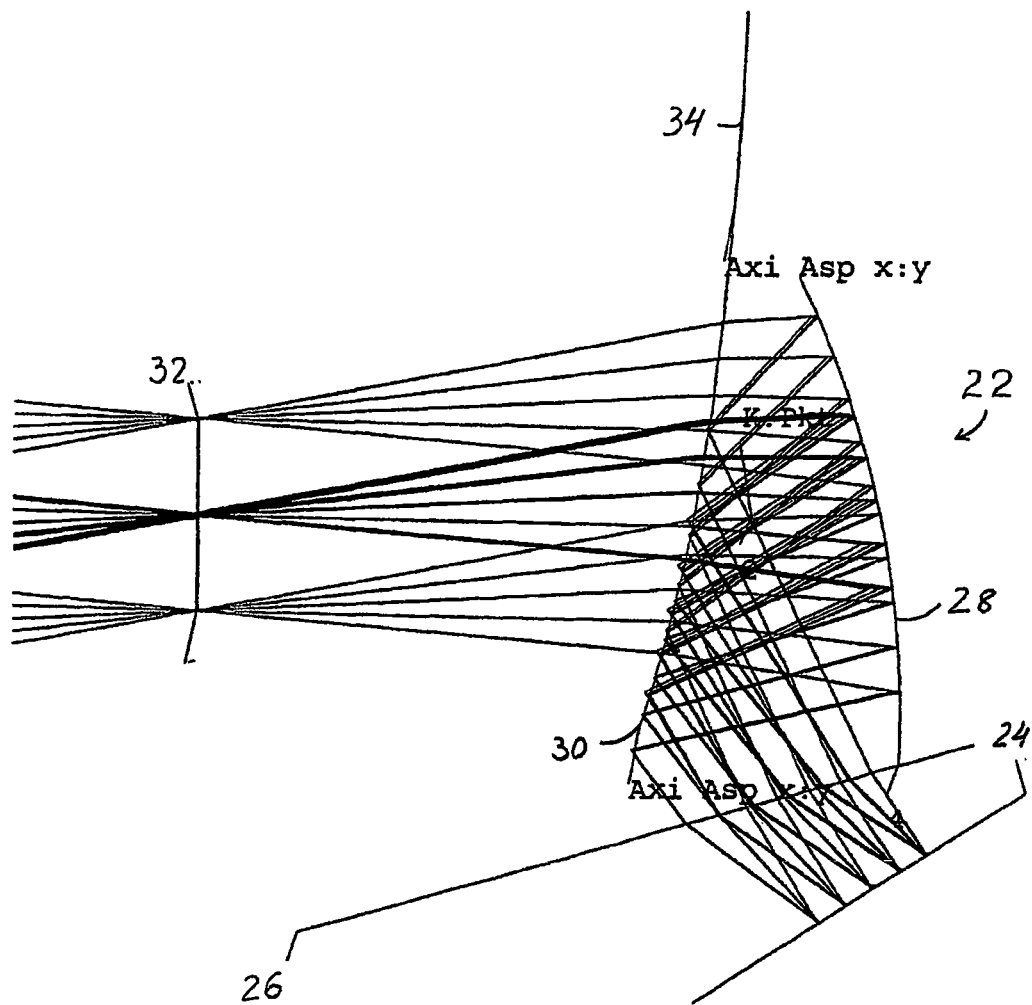
FIG. 2 ray path within the prism portion or zone of a preferred spectacle lens according to the invention.

FIG. 2 shows the ray path through the prism portion 22 of a preferred spectacle lens according to the invention. The light ray coming from a display 24, which is arranged laterally with respect to the spectacle lens, is totally reflected after entering through the side surface 26 of the spectacle lens in the prism portion 22 (in the following also referred to a side surface of the prism portion) at the eye-side surface 30 of the spectacle lens in the prism zone (in the following also referred to as eye-side surface of the prism portion) in the direction of the object-side surface 28 of the spectacle lens in the prism zone (in the following also referred to a object-side surface of the prism portion). Subsequently, the ray is reflected at the object-side surface 28 of the spectacle lens in the direction of the eye-side surface 30. After exiting through the eye-side surface 30 of the prism portion, the ray passes through the pupil 32 of one of the eyes of the spectacle wearer, so that an optical image of the display 24 is formed in a predetermined virtual distance.

The eye-side surface 30 of the prism portion is preferably a free-form surface that preferably transitions smoothly into the eye-side surface of the spectacle lens in the major portion zone 34 (eye-side surface of the major portion). The side surface 26 of the prism portion may for example be a plane surface. The object-side surface of the prism portion 28 may for example be a spherical surface. Alternatively, the object-side surface of the prism portion may be a free-form surface that in particular is calculated and optimized so as to minimize the aberrations of the spectacle lens in the prism zone and/or aberrations of the prism portion.

A reflection layer may be applied to the object-side surface of the prism portion 28. The reflection layer may be a semi-permeable or a fully reflecting reflection layer.

An important advantage of the preferred prism portion or the preferred ray path through the prism portion is that the eye-side surface is used twice for imaging.

In the optimization of the prism portion and in particular the surface design and/or position of the prism portion on the spectacle lens and/or arrangement of the prism portion with respect to the display, preferably individual parameters of the eyes of the spectacle wearer and/or of the position of wear of the spectacle lenses (forward inclination; corneal vertex distance, pupillary distance, face form angle, etc.) and/or individual centration data are taken into account. Alternatively, parameters of an average eye and/or of an average position of wear may be taken into account. A standardized average position of wear of a spectacle lens is for example described in DIN 58208 part 2.

First Embodiment

Object-side surface of the spectacle lens: Prism portion integrated as "near portion", i.e. a complex surface composed of object-side surfaces of the major portion and the prism portion;

Eye-side surface of the spectacle lens: single-piece surface extending continuously across the major and prism portions, i.e. no formation of a separate "near portion"

According to a first embodiment, the object-side surface is a composite (complex) surface having a base or major portion zone and a prism zone, wherein the design of the object-side surface of the spectacle lens differs in the major portion zone and in the prism zone. In the object-side surface of the spectacle lens, the object-side surface of the prism portion is integrated as the "near portion" (following the example of near portions of bifocal spectacle lenses). In other words, the object-side surface of the spectacle lens is formed as a complex surface composed of the object-side surface of the major portion and the object-side surface of the prism portion.

Depending on the design, the object-side surface of the prism portion may be adjoining the object-side surface of the major portion by means of a step, a bend, etc. Preferably, the step is concealed In particular, as explained above, the object-side surface of the prism portion may be formed as a spherical surface with a first radius of curvature smaller than the radius of curvature of the eye-side surface of the major portion. However, deviations from the spherical shape may occur in the transition zone between the prism zone and the major zone, for example to conceal the existing step or to compensate for the height difference of the object-side surface of the prism portion and the object-side surface of the major portion at the transition prism portion-major portion.

The object-side surface of the major portion may be a simple spherical or rotationally symmetric aspherical surface, the bending of which may for example be selected in a conventional manner roughly depending on the spherical, toric and/or prismatic power to be achieved (i.e. prescription power) and/or with respect to a cosmetic point of view. Also, the bending may be selected with respect to a production-engineering point of view.

Alternatively, the object-side surface of the major portion may be the prescription surface, i.e. be formed as a spherical or rotationally symmetric aspherical surface (in a non-astigmatic single-vision spectacle lens), a toric or atoric surface (in an astigmatic spectacle lens) or a progressive surface (in a progressive spectacle lens). In addition, a prism prescription may be taken into account.

The eye-side surface of the spectacle lens is a one-part, concave surface continuously extending across the major portion and the prism portion. Preferably, the eye-side surface of the spectacle lens represents the prescription surface of the spectacle lens. In the case of a single-vision spectacle lens for the correction of a spherical visual defect, the eye-side surface of the spectacle lens may be formed as a spherical or rotationally symmetric aspherical surface with a radius of curvature suitable to obtain the prescribed dioptric power. In the case of an astigmatic single-vision spectacle lens, the eye-side surface of the spectacle lens may be a toric or an atoric surface. In the case of a progressive spectacle lens, the eye-side surface of the spectacle lens may be a progressive surface.

Second Embodiment

Object-side surface of the spectacle lens: Prism portion integrated as "near portion", i.e. a complex surface composed of object-side surfaces of the major portion and the prism portion;
Eye-side surface of the spectacle lens: Prism portion integrated as "near portion", i.e. a complex surface composed of eye-side surfaces of the major portion and the prism portion; the eye-side surface of the prism portion is preferably a free-form surface.

In the spectacle lens according to the first embodiment, the eye-side surface of the spectacle lens is formed as a one-part (e.g. spherical) surface extending across the major portion and the prism portion.

According to a second embodiment, the eye-side surface of the spectacle lens, just like the object-side surface of the spectacle lens, is divided into a base or major portion zone and a prismatic zone or prism zone, wherein the design of the object-side surface of the spectacle lens differs in the major portion zone and in the prism zone. In other words, the eye-side surface of the spectacle lens is a complex surface composed of the eye-side surface of the major portion and the eye-side surface of the prism portion. Preferably, the eye-side surface of the prism portion is a free-form surface which is optimized and designed so as to achieve the necessary ray deflection of light rays from the display, wherein the prescription power is taken into account in order to be able to form an image of the display that is as sharp and distortion-free as possible.

The eye-side free-form surface of the prism portion is preferably calculated and optimized taking into account individual data of the spectacle wearer, comprising in particular refraction data of the spectacle wearer, data relating to the individual position of wear of the spectacle lens in front of the eyes of the spectacle wearer, data relating to the eyes of the spectacle wearer and/or data relating to the individual spatial location of the display of the spectacles or arrangement of the display with respect to the spectacle lens. Alternatively, merely average data or parameters may be taken into account.

The object-side surface of the preferred spectacle lens according to the second embodiment may be constructed like the object-side surface of a preferred spectacle lens according to the first embodiment. In particular, the object-side surface of the prism portion, as explained above, may be formed as a spherical surface with a first radius of curvature smaller than the radius of curvature of the eye-side surface of the major portion.

The production of the spectacle lens is preferably performed by means of a combination of the production methods developed for bifocal spectacle lenses and the production methods developed for individual spectacle lenses. In particular, the free-form surface may be fabricated by means of CNC machines on the basis of the determined surface date.

EXAMPLES

Figure 3A:
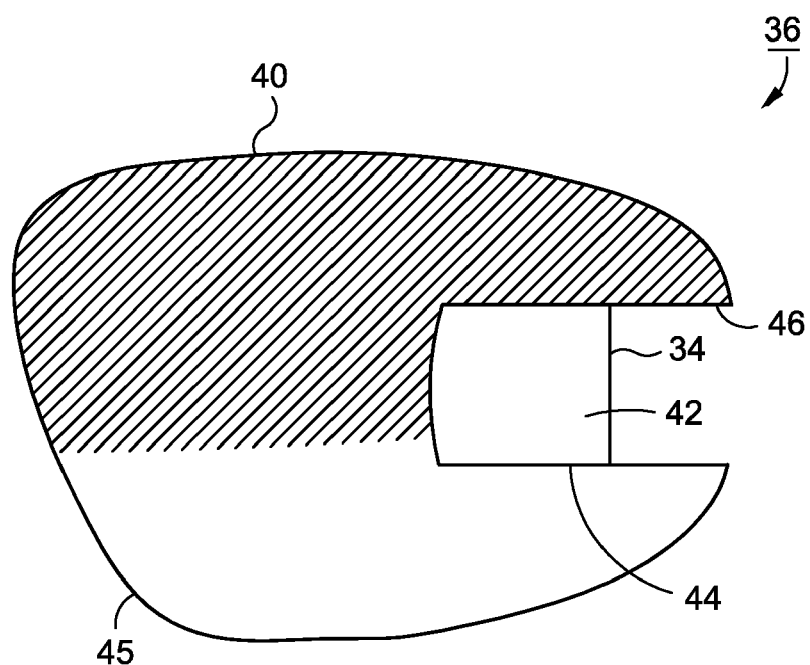
FIG. 3a front view of the spectacle lens of FIG. 3.
Figure 3B:
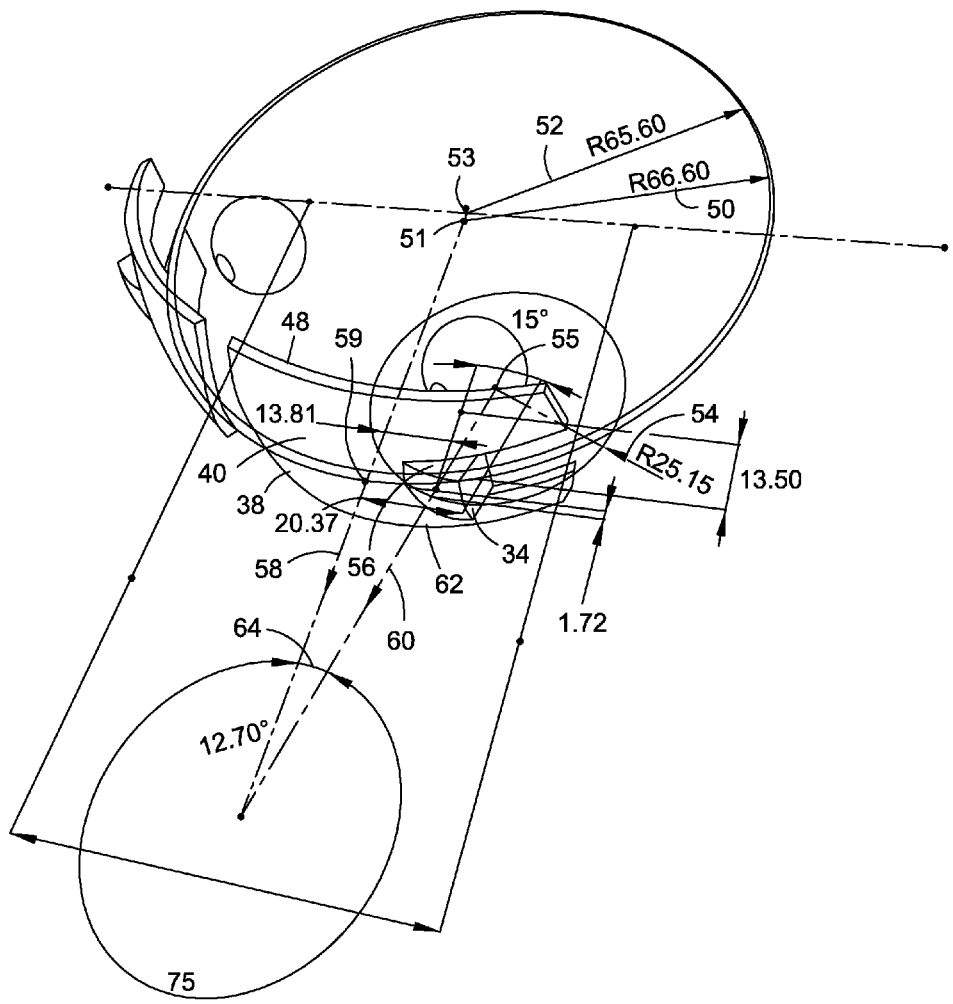
FIG. 3b position of wear of the spectacle lens of FIG. 3.

FIG. 3a shows a front view of a preferred inventive spectacle lens 36 according to the second embodiment, with a temporally (i.e. in the direction of the temples) displaced prism portion 44 and a base or major portion 45. FIG. 3b shows a perspective view of the system spectacle lens-eye in a predetermined position of wear of the spectacle lens in front of the eyes of the spectacle wearer.

Both the object-side surface and the eye-side surface of the spectacle lens are each divided into a prism zone and a base or major portion zone.

In the object-side surface 38 of the spectacle lens, the object-side surface of the prism portion is integrated as the "near portion". The object-side surface 38 of the spectacle lens has a base or major portion zone 40 and a prism zone 42 and is a complex surface composed of the object-side surface of the major portion 45 and the object-side surface of the prism portion 44. Adjoining the entrance surface for the ray path, i.e. to the entrance or side surface of the prism portion 44, the spectacle lens has a cutout 46 in order to be able to enlarge the horizontal lens size of the spectacle frame.

The eye-side surface 48 of the spectacle lens also is a complex surface composed of the eye-side surfaces of the prism portion and the major portion and having a prism zone and a base or major portion zone.

The object-side surface of the major portion is a spherical surface with a radius of curvature 50, wherein the sphere including the object-side surface of the major portion has the center 51. In the embodiment shown in FIG. 3b, the radius of curvature 52 of the object-side surface of the major portion is 66.6 mm.

The eye-side surface of the major portion 45 is also spherical with a radius of curvature 52 of 65.6 mm, wherein the sphere including the eye-side surface of the major portion has the center 53. Accordingly, the dioptric power of the major portion 45 is approx. 0, i.e. the major portion 45 is also formed as a "plano" lens without dioptric power. However, the major portion may be formed such that a predetermined dioptric power (spherical, astigmatic and/or prismatic) and optionally the change (addition) thereof may be obtained. Accordingly, the object-side surface or the eye-side surface of the major portion may be formed as a prescription surface (i.e. as a spherical or rotationally symmetric aspherical surface with a suitable radius of curvature, as a toric or atoric surface or as a progressive surface).

The object-side surface 38 of the spectacle lens in the prism zone 42 (object side surface of the prism portion) is a spherical surface with a radius of curvature 54, wherein the sphere including the object-side surface of the prism portion has the center 55. In the spectacle lens shown in FIG. 3b, the radius of curvature 54 of the object-side surface of the prism portion is 25.15 mm. However, the radius of curvature of the object-side surface of the prism portion may also have other values depending on the prescription and refraction data of the spectacle wearer. For example, different "base curves" may be provided for this surface, so that a broad power spectrum can be covered.

The origin of the coordinate system is in the geometric center of the object-side surface or the geometric center of the (raw-round) spectacle lens. If the spectacle lens is a predecentrated raw-round spectacle lens, the origin of the coordinate system is to be shifted by the decentration vector with respect to the geometric center. The horizontal direction (x axis) is e.g. determined by the horizontal axis according to permanent engravings on the spectacle lens.

In the vertical direction (y axis), the spherical object-side surface 38 of the prism portion is adjoining the spherical object-side surface of the major portion by means of a step 56. The sides of the step may be slightly slanted, so that the angle forming the step with the object-side surface of the spectacle lens in the major portion differs by 90°. Thereby, taking the finished spectacle lens out of the casting mould in a production by means of a casting method is facilitated. The step 56 may be concealed by means of a suitable design of the object-side surface of the prism portion, preferably such that the object-side surface of the prism portion is at least once, preferably twice, continuously differentiably adjoining the object-side surface of the major portion.

In the horizontal direction (x axis, i.e. lens horizontal axis according to permanent engravings on the spectacle lens), no step is present between the object-side surface of the prism portion and the object-side surface of the major portion. The object-side surface of the prism portion is adjoining the object-side surface of the major portion by forming a bend or kink. Preferably, the angle between the surface normal of the object side surface of the prism portion and the major portion at the transition between the major portion and the prism portion is less than 45°, preferably less than 25°, particularly preferably less than 10°.

However, the object-side surface of the prism portion may be formed such that the object side surface of the prism portion is preferably twice continuously differentiably adjoining the object-side surface of the major portion.

The prism portion formed as a near portion, having a radius of the object-side surface of 25.15 mm, is incident on the object-side surface of the major portion, having a radius of 66.6 mm, at an angle of 12.07°. Here, the axis intersects the coordinate (13.81 mm, 0 mm, 1.72 mm) in vertex depth coordinates with respect to the lens center or the optical center of the object-side surface 38. The prism portion is centrally positioned about the y axis. The maximum height of the prism portion is approx. 12 mm.

In other words, the horizontal components of the surface normal 58 of the object-side surface of the major portion in the geometric center 59 of the front surface of the spectacle lens and the surface normal 60 of the object-side surface of the prism portion in the geometric center 62 of the object-side prism surface (or geometric center of the prism portion) enclose an angle 64. In the spectacle lens shown in FIG. 3b, the angle 64 is 12.7°.

The eye-side surface of the prism portion is a free-form surface that is adjoining the eye-side surface of the major portion by forming a small bend or kink.

Preferably, the spectacle lens is calculated and optimized such that from the geometric center of the spectacle lens (see above) or the geometric center of the front surface of the spectacle lens, the vertex depth of the eye-side surface of the prism portion (free-form surface of the prism portion) is adjoining the eye-side surface of the major portion by forming a small bend or kink (i.e. with a small bend in the eye-side surface). This may e.g. be achieved by means of a translatory shift of the eye-side surface of the prism portion (free-form prism surface) and by a suitable selection of the base curve.

The prism portion may be calculated in a first coordinate system with a predetermined coordinate origin. The vertex depth coordinates of the prism portion are accordingly indicated in the first coordinate system. By a coordinate transformation taking into account the above-described translation of the prism portion, the vertex depths of the surfaces of the prism portion (object-side surface of the prism portion, eye-side free-form surface of the prism portion and side-surface of the prism portion) may be calculated and transformed in the above-mentioned coordinate system with an origin in the geometric center (optionally corrected by the predecentration) of the object-side surface of the prism portion.

Preferably, the angle between the horizontal component of the surface normal of the eye-side surface of the prism portion and the horizontal component of the surface normal of the eye-side surface of the major portion is less than 5°, preferably less than 2°, particularly preferably less than 1°.

The surfaces of the spectacle lens, in particular the free-form surface of the prism portion, have been calculated and optimized preferably taking into account individual data of the spectacle wearer, comprising in particular refraction data of the spectacle wearer, data relating to the individual position of wear of the spectacle lens in front of the eyes of the spectacle wearer (forward inclination, face form angle, corneal vertex distance, centration data, etc.), data relating to the eyes of the spectacle wearer (e.g. pupillary distance) and/or data relating to the spatial location of the display of the spectacles or location of the display with respect to the spectacle lens. Alternatively, merely average data may be taken into account.

Preferably, the spectacle lens is arranged in front of the eyes of the spectacle wearer such that the normal of the pupil area is parallel to the surface normal of the object-side surface in the geometric center of the spectacle lens. Here, in particular a pupil with a pupil diameter of 5 mm is taken into account.

The reference points for the pupil, the prism portion (object-side surface of the prism portion), the display and the center of the prism surface (eye-side free-form surface of the prism portion) in this embodiment are for example:
  pupil (13.8138; 0; −16.7827);
  prism portion (13.8138; 0; 1.7173);
  side surface of the prism portion (22.2753; 0; −4.8476);
  display (23.8429; 0; 1.1915)
  center of the free-form surface of the prism portion (13.115; 0; 4.9762).

As explained above, the origin of the coordinate system is in the (optionally corrected) geometric center of the object-side surface or in the (optionally corrected) geometric center of the spectacle lens. The horizontal direction (x axis) is predetermined e.g. by the horizontal axis according to permanent engravings on the spectacle lens.

The surface normal of the side surface 34 of the spectacle lens preferably encloses an angle of −45° to +45°, preferably from −15° to +15°, particularly preferably 0°, with the surface normal of a display (not shown in FIG. 3b). The display is preferably arranged such that the surface normal of the display and the surface normal of the object-side surface of the spectacle lens in the geometric center of the spectacle lens enclose an angle of approx. 58.83°. Consequently, the optimum direction of sight in the prism portion in this embodiment is parallel to the surface normal of the object-side surface in the geometric center of the spectacle lens. An adjustment of the sight deviation in this embodiment takes place by rotating the entire spectacle lens about the ocular center of rotation by the desired angle (horizontally and vertically). Preferably, the position, the viewing angle into the prism or the prism portion and/or desired viewing angle can be individually adjusted. In other words, the position, the viewing angle into the prism or the prism portion and/or desired viewing angle can be set and determined individually depending on the individual position of wear of the spectacle lens in front of the eyes of a specific spectacle wearer.

Figure 4A:
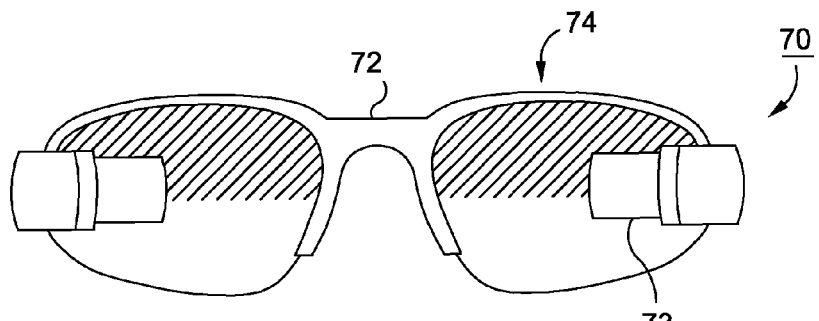
FIG. 4a front view of the spectacles.
Figure 4B:
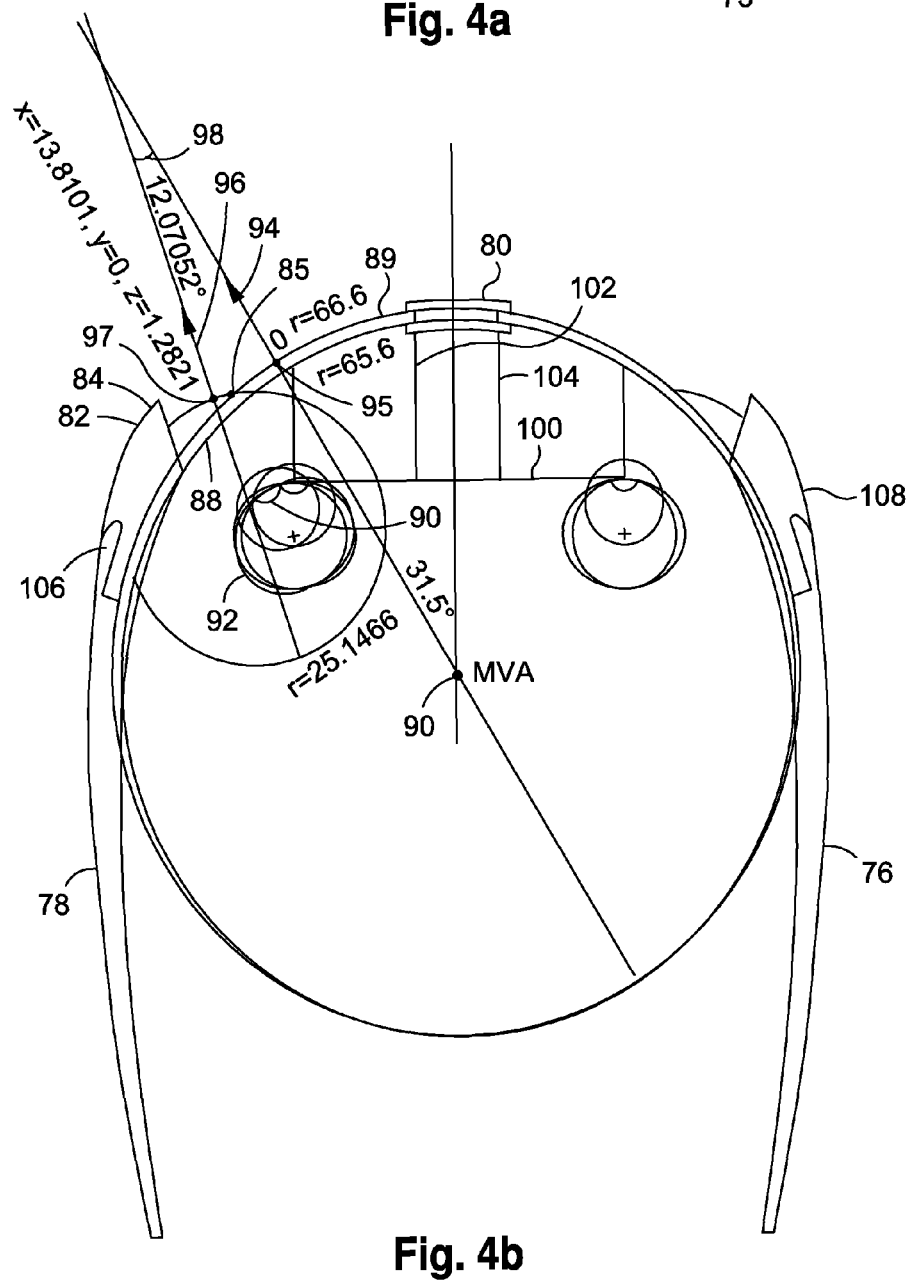
FIG. 4b position of wear of the spectacles (top view)

FIG. 4a shows spectacles 70 with a preferred inventive spectacle lens 74 incorporated in a spectacle frame 72, with a temporally displayed prism portion 73. FIG. 4b shows a schematic illustration of the system spectacles-eye when the spectacles are worn (top view).

The spectacle frame 72 has two spectacle sides 76 and 78 and a bridge portion 80. A display 82 is integrated in the spectacle frame. The display may for example be an OLED, a liquid crystal display or another suitable display. Preferably, the spatial dimensions of the display are equal to or less than 12 mm×13 mm×3 mm (width×length×height).

The display 82 is arranged such that the light rays coming from the display, after entering through the preferably plane side surface 84 of the prism portion, are at least once reflected (totally) at the eye-side surface of the prism portion in the direction of the object-side surface 82 of the spectacle lens. After the total reflection at the eye-side surface, the rays are reflected at the object-side surface in the direction of the eye-side surface of the prism portion. Preferably, the display is arranged at the side-surface of the prism portion. Further preferably, the position of the display is set and determined depending on the prescription power of the spectacle lens to be achieved (i.e. power and refraction data of the spectacle wearer) and/or individual parameters of the eyes of the spectacle wearer and/or individual position of wear of the spectacle lens. The display 82 may for example be arranged in a similar manner with respect to the spectacle lens 74, as is described in connection with FIGS. 3a and 3b.

After exiting through the eye-side surface 88, the rays pass through the pupil 90 of, for example, the left eye 92 of the spectacle wearer, so that an optical image of the display 82 is formed in a predetermined virtual distance. The virtual distance may vary depending on the main task of the spectacles. The virtual distance may for example be 1 m to 5 m, preferably 2 m to 3 m. For example, a virtual distance of 3 to 5 m is for example well suitable for spectacles worn during jogging. For other fields of use, a shorter or longer distance may be advantageous. Alternatively, the image of the display 82 may be formed in infinity. The prism portion and the arrangement, surface design and the ray path through the prism portion are preferably optimized such that the refraction of the spectacle wearer is taken into account as well.

The spectacle lens may be a spectacle lens that has substantially the same construction and the same parameters as the spectacle lens shown in FIGS. 3a and 3b. As for the features of the spectacle lens, reference is made to the corresponding description of the spectacle lens shown in FIGS. 3a and 3b.

Alternatively, like in the first embodiment, the spectacle lens may also be simply a complex surface composed of a surface of the prism portion and a surface of the major portion.

The object-side surface 89 of the major portion may for example be a spherical surface with a radius of curvature of 66.6 mm, wherein the sphere including the spherical surface of the major portion has the center 90. The eye-side surface 88 of the spectacle lens is a concave, spherical surface having a radius of for example 65.6 mm and continuously extends across the major portion and the prism portion. Accordingly, the major portion has a dioptric power of approx. 0, i.e. is formed as a "plano" lens. As explained above, the major portion may however also be formed such that it has a dioptric power and optionally a predetermined change of the dioptric power (addition) required for the correction of the visual defect of the spectacle wearer. Correspondingly, the eye-side surface may be formed as a spherical or rotationally symmetric aspherical surface with a suitable radius of curvature (in a non-astigmatic single-hyphen vision spectacle lens), as a toric or atoric surface (in an astigmatic single-vision spectacle lens) or as a progressive surface (in a progressive spectacle lens).

The object-side surface 86 of the prism portion of the spectacle lens having a plano power illustrated in FIGS. 4a and 4b is—like in the spectacle lens shown in FIGS. 3a and 3b—a spherical surface with a radius of curvature of 25.15 mm. The radius of curvature of the object-side surface of the prism portion may also have other values depending on the required dioptric power of the spectacle lens and the refraction data of the spectacle wearer to be considered. For this surface, different "base curves" may be provided, so that a broad power spectrum can be covered.

The horizontal components of the surface normal 94 of the object-side surface of the major portion in the geometric center 95 of the front surface of the spectacle lens and the surface normal 96 of the object-side surface of the prism portion in the geometric center 97 of the object-side prism surface (or geometric center of the prism portion) enclose an angle 98 which is 12.07° in this embodiment.

The center 97 has the following coordinates (x=13.81, y=0, 7=1.28), wherein the coordinate system is also defined like the coordinate system in FIG. 3b.

With respect to further features of the spectacle lens not described here, reference is made to the corresponding description of the spectacle lens shown in FIGS. 3a and 3b.

Furthermore, the reference numeral 100 in FIG. 4b designates the line that connects the pupil centers of the two eyes of the spectacle wearer; the reference numerals 102 and 104 designate the demarcation lines of the bridge portion 80.

In the spectacle frame, at least one power source 106 and a driving device 108 for driving the display are integrated. The display may e.g. be driven by means of radio transmission. Alternatively, a flat cable connection between the display and the driving device may be provided.

As described above, all components (including display, power source, driving device) are integrated in the spectacles (or the spectacle lenses and the spectacle frame), so that the spectacles represent an autarkic system, i.e. a system without cable connection to other systems.

Preferably, the spectacles include a display device, i.e. as an interface to arbitrary terminal devices. Preferably, the connection to the terminal devices is established in a wireless manner by means of radio transmission.

Figure 5A:
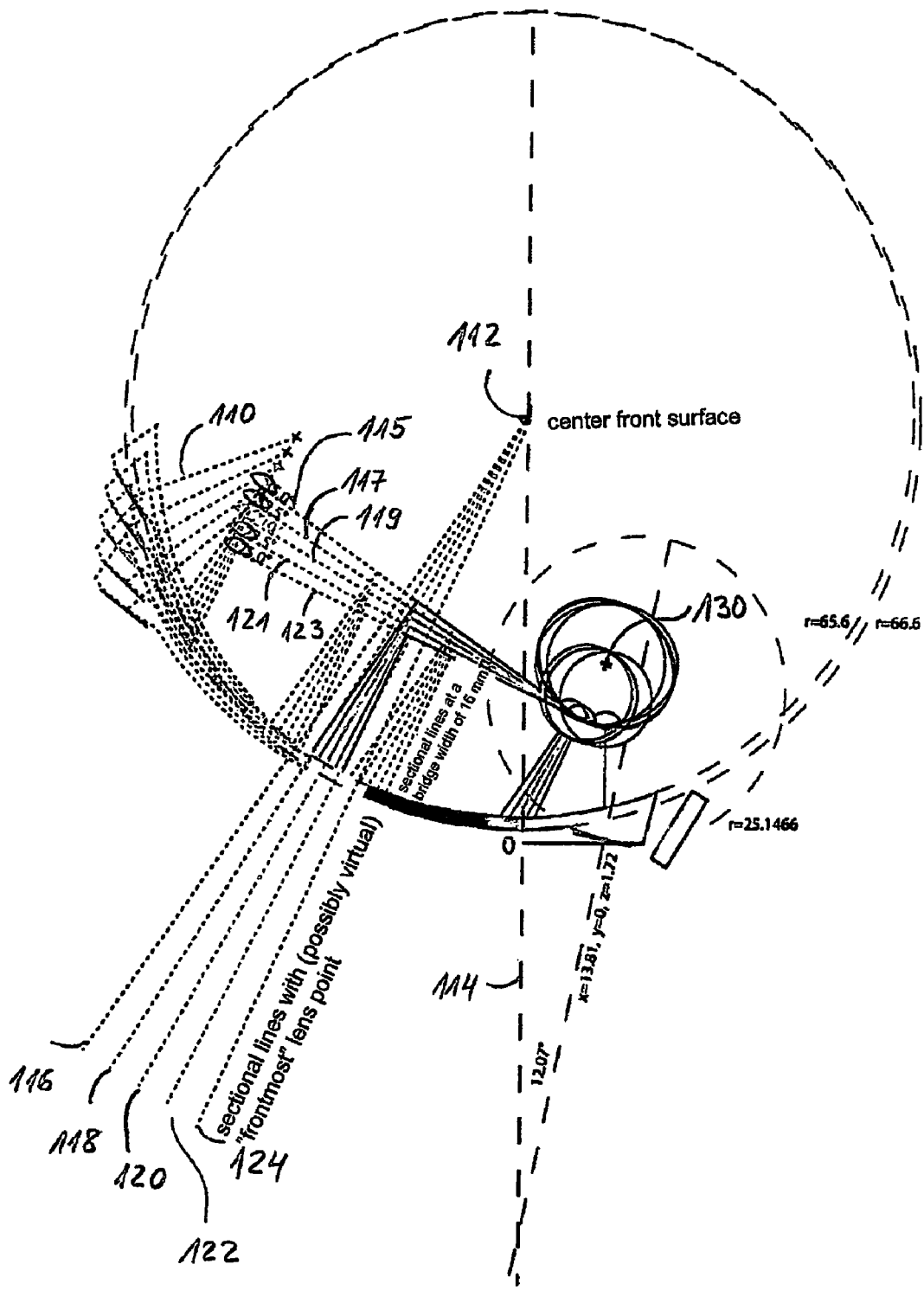
FIGS. 5(a-c) ray paths in the system spectacle lens-eye with different sight deviations FIG. 5a top view.
FIG. 5b side view.
FIG. 5c front view.
Figure 5B:
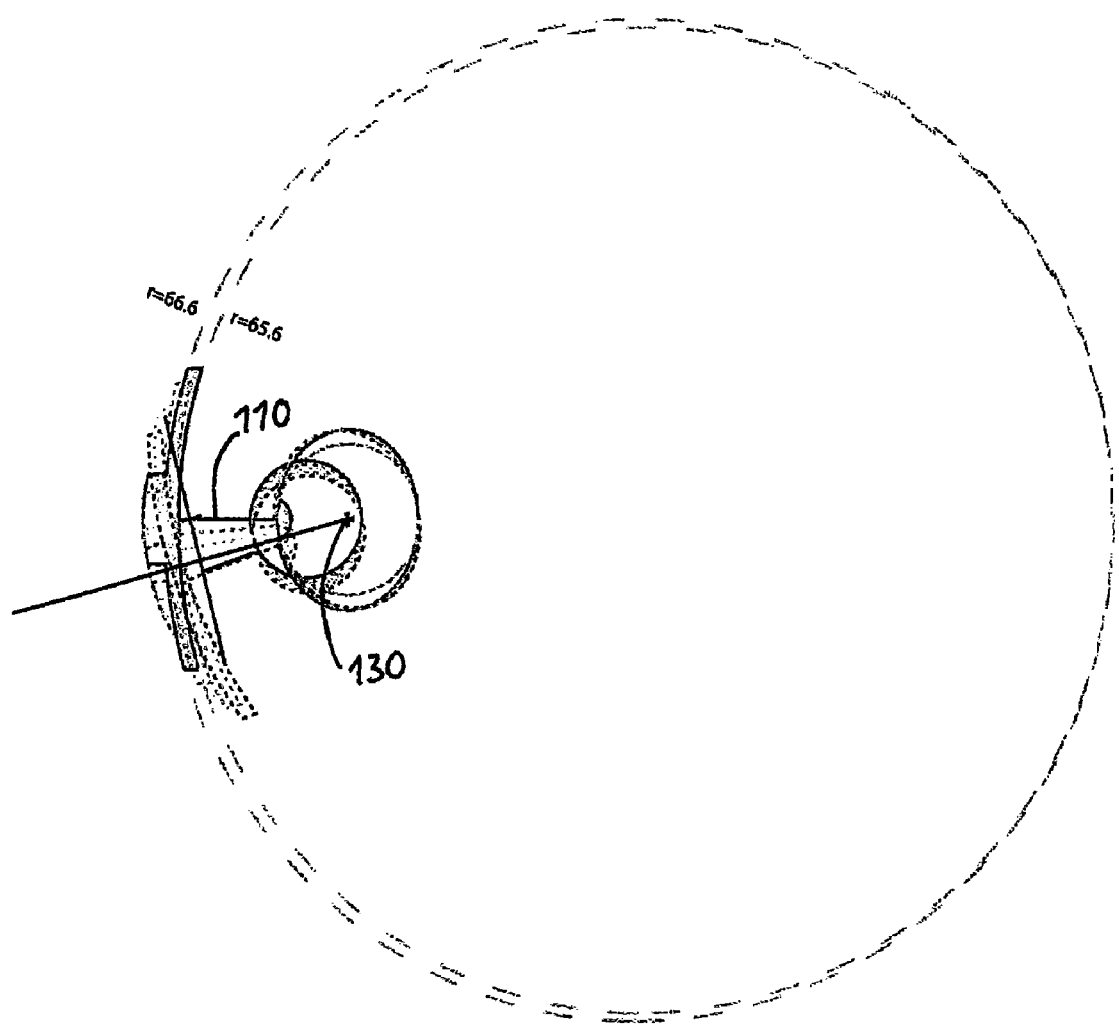
Figure 5C:
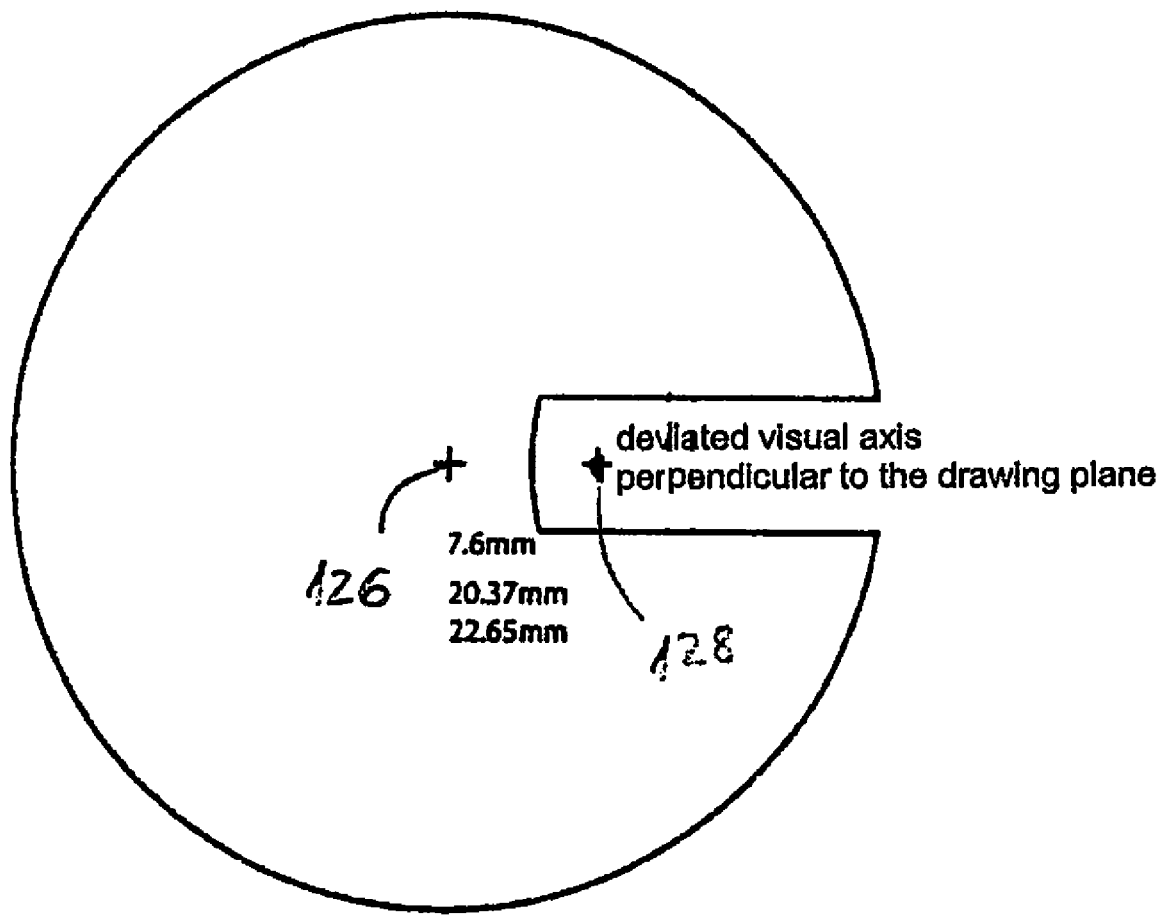

FIGS. 5a and 5b show a spectacle lens, which was rotated about the ocular center of rotation 130 in different positions for an sight deviation, and the corresponding ray path in the system spectacle lens-eye in a predetermined (average or individual) position of wear of the spectacle lens. FIG. 5a shows a top view and FIG. 5b a side view in cross section of the displaced visual axis 110. FIG. 5c shows a front view of an unedged spectacle lens with a temporally displaced prism portion according to the second embodiment. The spectacle lens shown in FIGS. 5a to 5c for example has the same parameters (position and radii of curvature of the eye-side and object-side surfaces of the major portion and the prism portion) like the spectacle lens shown in FIGS. 3a and 3b or FIGS. 4a and 4b.

FIG. 5a schematically shows the rotation of the spectacle lens about the ocular center of rotation for different sight deviations of 25° to 30° in steps of 2.5° for vision through the prism portion of a spectacle lens with defined position of the prism portion. Depending on the sight deviation, the prism portion formed as the "near portion" comes into the field of sight of the spectacle wearer. The symmetry axis of the frame rotates together with the underlying sight deviation. In the case of FIG. 5a, the face form angle changes. Of course, in an individual optimization of the prism portion, the position, the face form angle and other individual parameters of the position of wear of the spectacle lens may be taken into account as well, so that only the prism surfaces (object-side and/or eye-side surfaces of the prism portion) change, but not the position of the spectacle lens.

In FIG. 5a, the reference numeral 112 designates the center of the sphere including the spherical front surface of the major portion, the reference numeral 114 designates the surface normal of the front surface through the (optionally corrected) geometric center of the (raw-round) spectacle lens.

In FIGS. 5a and 5b, the coloured dashed lines 115, 117, 119, 121 and 123 represent the connection lines of the two pupils (simplified as a symmetric case with a pupillary distance of 64 mm). The colored, the dashed lines 116, 118, 120, 122 and 124 relate to the zero directions of sight in different eye-excursions.

FIG. 5b shows a sectional side view of the displaced visual axis 110 of the in a predetermined position of wear (average or individual) in front of the eyes of the spectacle wearer, wherein in this section the displaced visual axis is perpendicular to the prism surface. As can be taken from FIG. 5b, the prism portion moves downward with the forward inclination of the spectacle lens.

FIG. 5c shows a front view perpendicular to the geometric center 126 of the spectacle lens. The point 128 on the object-side surface of the prism portion is the penetration point of the deviated visual axis with the object-side surface of the spectacle lens.

The distances of the perpendicular projections of the prism transitions from the spectacle lens and/or edges from the side surface of the spectacle lens each are 7.6 mm, 20.37 mm and 22.65 mm.

Preferably, the prism portion is designed and arranged such that the deviated visual axis hits the prism surface under the same conditions as required in FIGS. 5a and 5b. Theoretically, each arbitrary rotation of the spectacle lens about the ocular center of rotation 130 and the visual ray is allowed. However, it is advantageous for physiological reasons if the deviated visual axis remains less than 35° to the side (temporal or nasal) and less than 20° to the vertical (downward or upward). It is also advantageous if the prism portion is designed and arranged such that the field of view is influenced as little as possible. A position or an arrangement of the prism portion laterally horizontally (temporally or nasally) and vertically displaced downward is advantageous.

Particularly preferably, the position of the prism portion is optimized individually for a specific spectacle wearer and for a specific position of wear. The position of the prism portion may be set and calculated in an optimized manner in particular depending on the viewing angle, face form angle, corneal vertex distance, base curve of the major lens, etc.

Figure 6A:
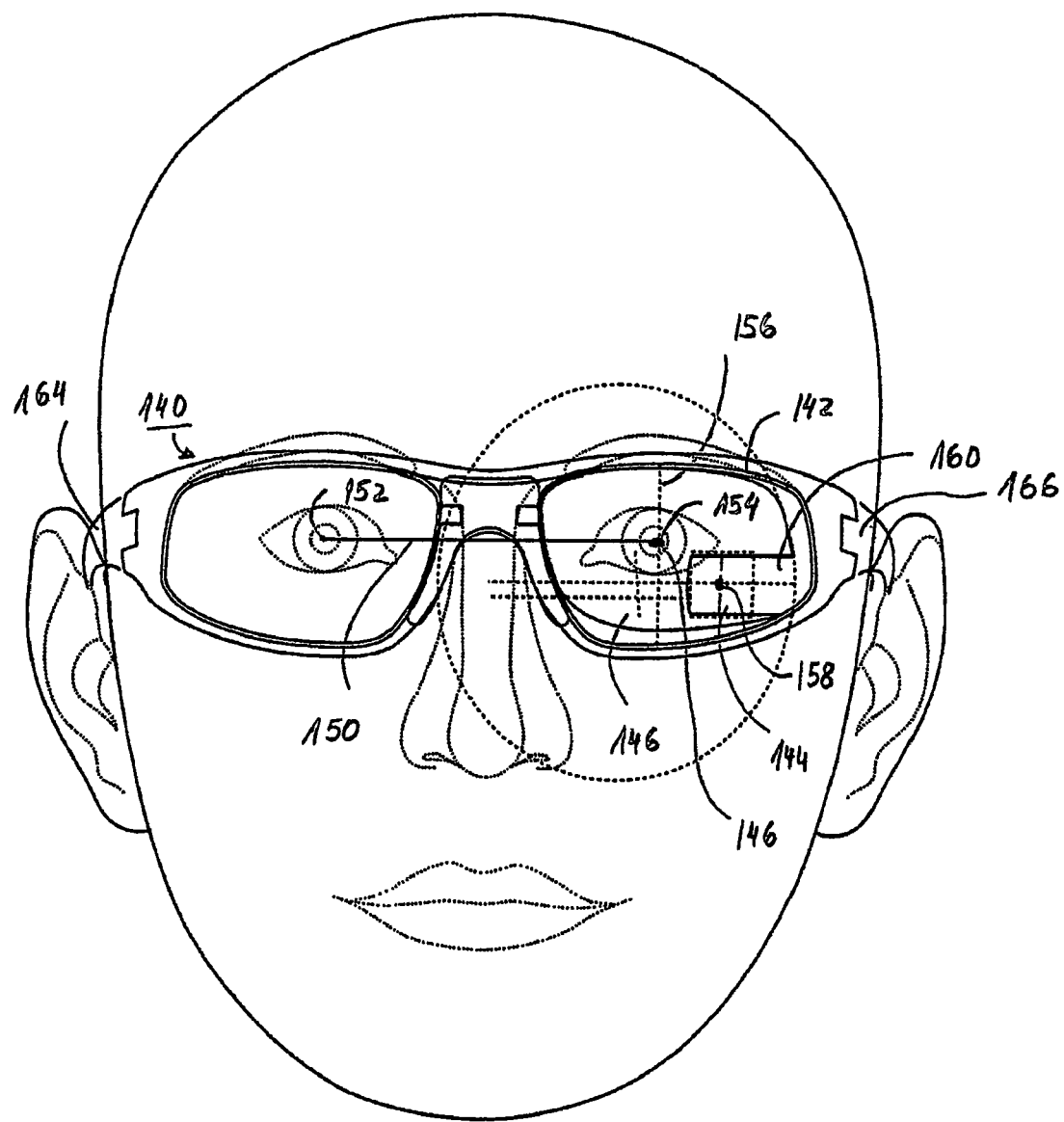
FIG. 6a front view.
Figure 6B:
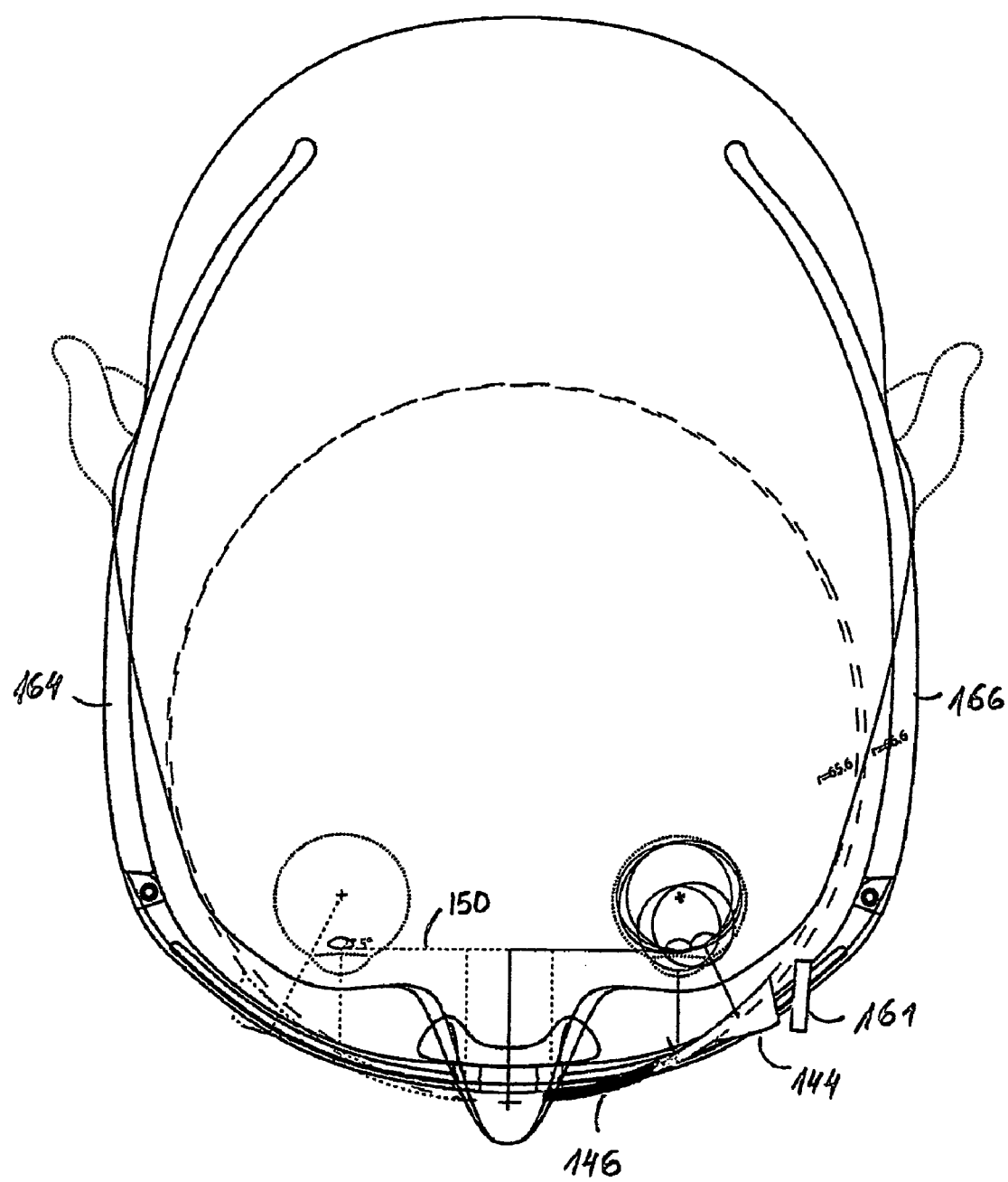

FIGS. 6a and 6b show a front view (FIG. 6a) and a top view (FIG. 6b), respectively, of a spectacle wearer with worn spectacles 140 with a preferred inventive spectacle lens 142. The spectacle lens shown in FIGS. 6a to 6c for example has the same construction (position and radii of curvature of the eye-side and object-side surfaces of the major portion and the prism portion, etc.) as the spectacle lens shown in FIGS. 3a and 3b or FIGS. 4a and 4b.

The spectacle lens 142 has a temporally displaced, integrated prism portion 144 and a base or major portion 146.

For example, the spectacles are arranged in front of the eyes of the spectacle wearer such that the visual ray in the zero direction of sight coincides with the fitting point 148 of the spectacle lens. In FIGS. 6a and 6b, a virtual line 150, which connects the pupil centers 152, 154 of the right and the left eye of the spectacle wearer, indicates the horizontal direction in the position of wear of the spectacles. Line 156, which is perpendicular to the line 150, which lies in one plane including the lines 150 and the tangent of the front surface in the fitting point, indicates the vertical direction. The normal to the plane, which includes the line 150 and the tangent of the front surface in the fitting point, indicates the z direction. However, it is possible to take into account a deviating, individual arrangement of the spectacles in the optimization of the spectacle lens and in particular the prism portion.

The prism portion 144 is displaced from the fitting point of the spectacle lens horizontally in the direction temporally and vertically downward, so that in a predetermined sight deviation at an angle of between 25° and 45° temporally, preferably 30° to 35°, and preferably at an angle of up to 40°, preferably 15° to 20° downward, the deviated visual axis passes through the center of the front surface of the prism portion. The vertical distance between the fitting point 148 and the geometric center 158 of the prism portion in particular depends on the centration data and the desired viewing angle. In particular, in a static case, this distance may be determined and specified depending on values for the pupillary distance, corneal vertex distance, face form angle, forward inclination and the desired sight deviation.

Preferably, the prism portion has the following dimensions;
 height of the rectangle circumscribing the prism portion in the vertical y direction, between 5 and 20 mm, preferably between 10 and 15 mm, particularly preferably 12 mm;
 width of the rectangle circumscribing the prism portion in the horizontal x direction, between 5 and 20 mm, preferably between 10 and 15 mm, particularly preferably 12 mm;
 maximum height in the z direction (thickness of the prism portion), between 2 and 20 mm, preferably between 4 and 10 mm, particularly preferably 7 mm.

The spectacle frame has a portion 160 preferably at least extending partially across the prism portion or the spectacle lens. In the spectacle frame, preferably in the portion 160 extending across the prism portion, a display 161 is integrated.

Also, the spectacle frame has a bridge portion 162 and two spectacle sides 164 and 166.

Figure 7A:
Figure 7B:
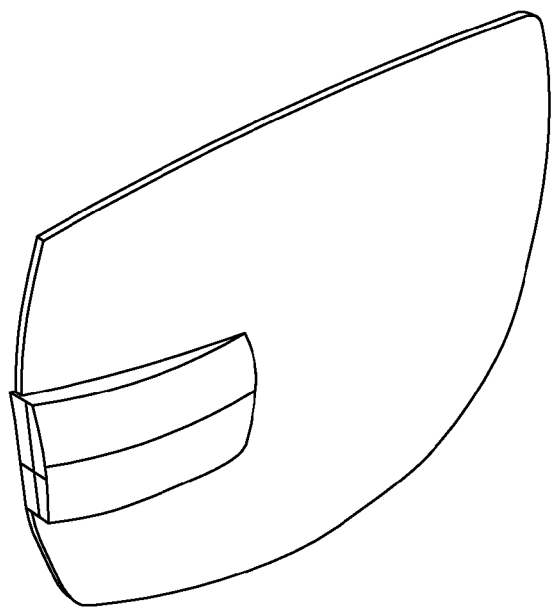
FIG. 7b perspective view.
Figure 7C:
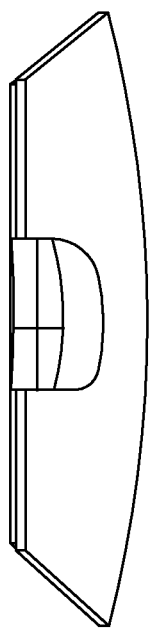
FIG. 7c side view.
Figure 7D:
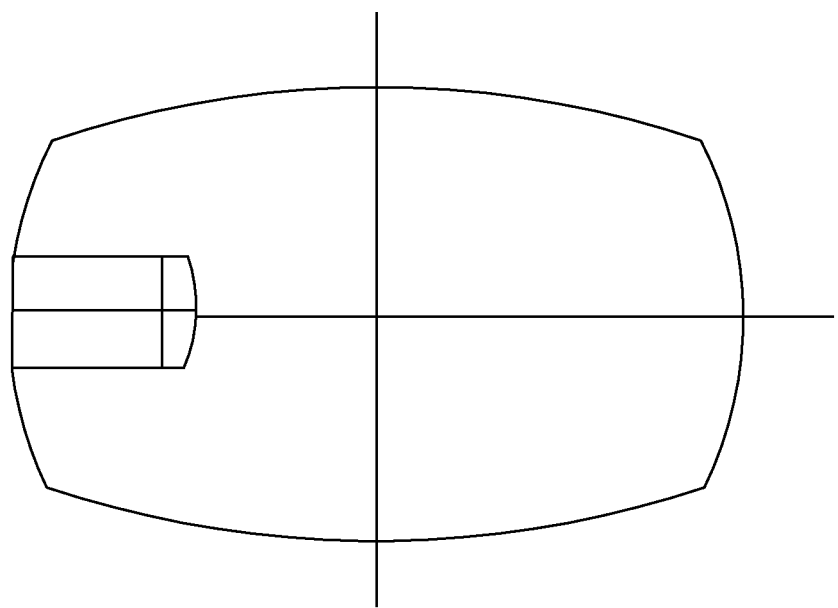
FIG. 7d front view.

FIGS. 7a to 7d show a spectacle lens with an integrated prism portion which does no longer have a "round" shape when viewed from the front (FIG. 7a top view), FIG. 7b perspective view, FIG. 7c side view, FIG. 7d front view).

The object-side surface of the prism portion of a spectacle lens according to the first or the second embodiment and as shown e.g. in FIG. 3a, 3b or 4a, 4b is formed as a spherical surface. Deviations from the spherical shape may merely come up in the transition zone between the prism zone and the major zone e.g. in order to conceal the present step and to compensate for the height difference of the object-side surface of the prism portion and the object-side surface of the major portion at the transition prism portion-major portion. However, the object side surface of the prism portion may also be formed as a non-spherical surface, in particular a free-form surface, which in particular is calculated and optimized so as to minimize the refractive power and/or astigmatic errors of the prism portion. In particular, the object-side surface of the prism portion may be calculated and optimized such that it is at least once, preferably twice, continuously differentiably adjoining the object-side surface of the major portion.

Figure 8:
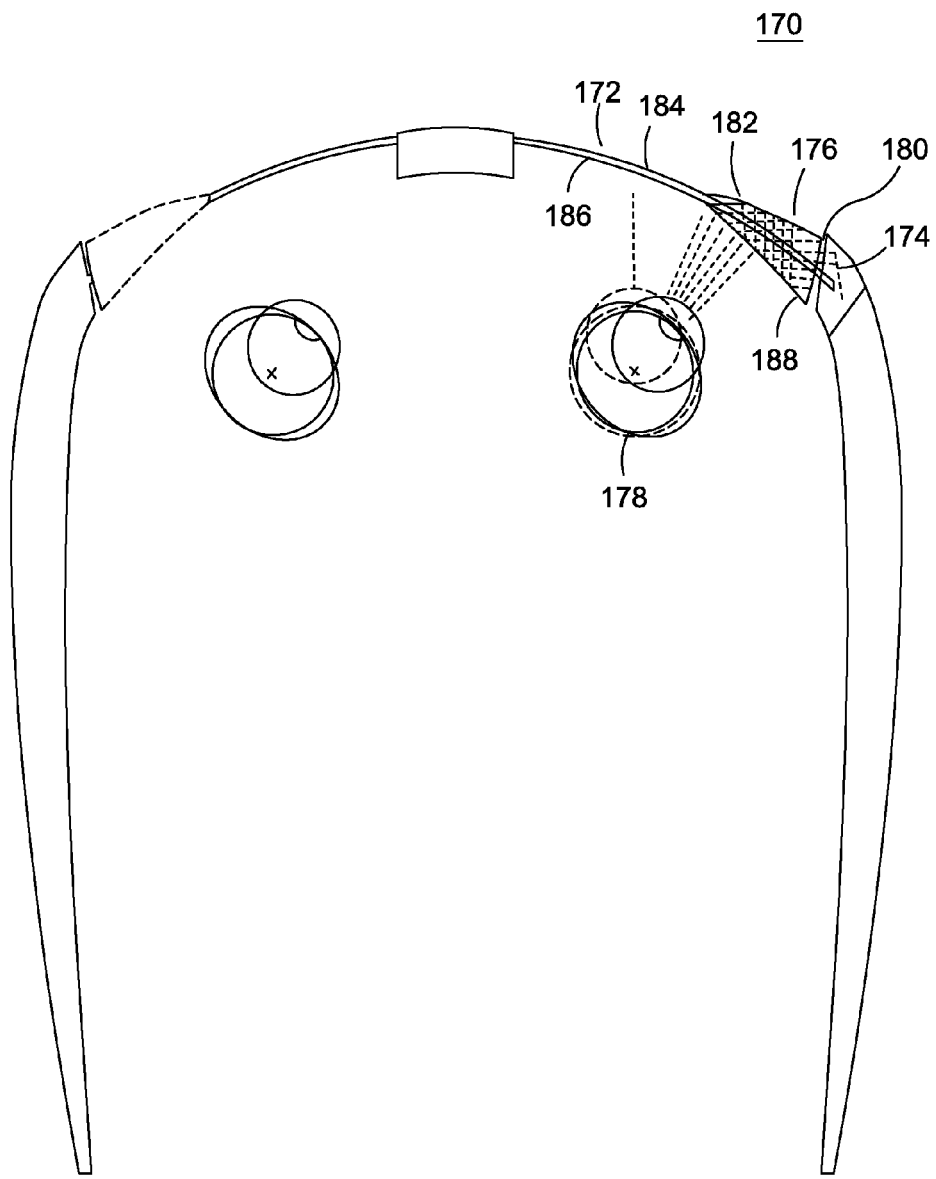
FIG. 8 a top view of a spectacle lens with integrated prism portion according to a third embodiment of a preferred embodiment of the invention.

FIG. 8 shows spectacles 170 with a preferred spectacle lens 172 according to the second embodiment and a display 174 integrated in the spectacle frame, wherein the spectacles are arranged in the position of wear in front of the eyes of the spectacle wearer. FIG. 8 also shows the ray path of the rays coming from the display 174 through the prism portion 176. The reference numeral 178 designated the eye of the spectacle wearer in front of which the spectacle lens is arranged with the prism portion.

The display 174 is arranged such that the light rays coming from the display, after entering through the side surface 180 of the prism portion, are at least once, preferably several times, reflected at the eye-side surface of the prism portion in the direction of the object-side surface of the prism portion by means of total reflection, and reflected (back) at the object-side surface of the prism portion 182 in the direction of the eye-side surface 188 of the prism portion. After exiting through the eye-side surface of the prism portion 188, the rays pass through the pupil of the respective eye 178 of the spectacle wearer, so that an optical image of the display 174 is located at a predetermined finite of infinite virtual distance.

Both the object side surface and the eye-side surface of the spectacle lens 172 are composite complex surfaces each having a base or major portion zone and a prism zone. In the object-side surface of the spectacle lens, the object-side surface of the prism portion is integrated as the "near portion", as explained above. The object-side surface 182 of the prism portion 176 is a spherical surface with a radius of curvature of 25.15 mm. However, the radius of curvature of the spherical surface may in particular also have other suitable values, e.g. depending on the refraction data of the spectacle wearer.

In the spectacle lens shown in FIG. 8, the radius of curvature of the spherical object-side surface 184 of the major portion is for example 66.5 mm. However, the spherical object-side surface 184 of the major portion may have another radius of curvature of for example 54 or 80 mm. Also, the object-side surface 184 of the major portion may be a toric surface with main radii of curvature of for example 80 and 50 mm ($R_h$=80 mm, $R_v$=50 mm).

The eye-side surface of the spectacle lens is composed of the eye-side surface of the major portion 186 and the eye-side surface 188 of the prism portion (prism surface) recessed therein. The eye-side surface 186 of the major portion represents the prescription surface of the spectacle lens. In the case of a dioptric power of approx. 0, the eye-side surface 186 of the major portion is formed as a spherical surface with a radius of 65.6 mm.

The eye-side surface 188 of the prism portion is a free-form surface, which is once, preferably twice, continuously adjoining the eye-side surface 186 of the major portion. Preferably, the eye-side surface of the spectacle lens, and in particular the eye-side free-form surface 188 of the prism portion, is formed such that the following production engineering-induced default and threshold values are observed:
Surface refractive power related to the refractive index n=1.525
whole surface: less than 27 D, preferably less than 20.25 D, particularly preferably less than 13.5 D
prism area: less than 24 D, preferably less than 25.5 D, particularly preferably less than 17.0 D
local maximum: less than 38 D, preferably less than 28 D, particularly preferably less than 19.0 D
absolute maximum: less than 42 D, preferably less than 31.5 D, particularly preferably less than 21.0 D.
Both for the prism and the major portions, there follows for the maximum refractive power increase (related to a refractive index n=1.525):
astigmatism: less than 1.4 D/mm, preferably less than 1.05 D/mm, particularly preferably less than 0.7 D per mm;
per principal meridian; less than 2 D/mm, preferably less than 1.5 D/mm, particularly preferably less than 1.0 D per mm.
Preferably, the prism area is a rather elongated area with a size of approx. 1 to 2 cm², e.g. 5 mm×15 mm. A local maximum is restricted to a few mm² and only to a principal meridian with larger cylinder (cyl.), e.g. 1 mm×3 mm. Preferably, an absolute maximum is only present at the lens edge and virtually only in one point.

The eye-side surface of the prism portion or the prism surface 188 is fabricated in a first approach/attachment after fabrication of an eye-side spherical surface in a second step. To this end, the prism surface is extrapolated or calculated and optimized such that the surface data of the "second" rear surface lie merely in the area of the prism portion or in the prism zone in the spherical rear surface.

Further preferably, the calculation or optimization of the eye-side free-form surface of the prism portion is performed taking into account the position of wear of the spectacle lens of the spectacles in front of the eyes of the spectacle wearer. In doing so, an average position of wear, as is e.g. standardized in DIN 58 208, or an individual position of wear may be taken into account.

Figure 9:
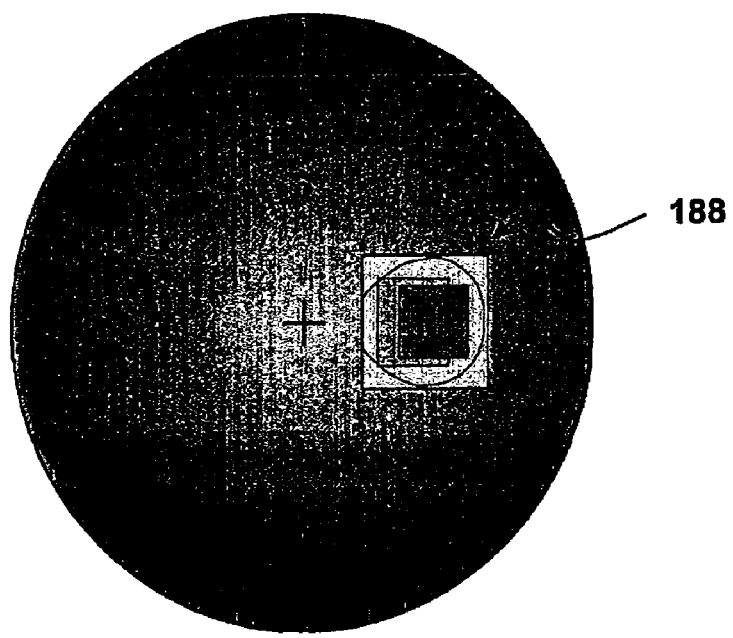
FIG. 9 embedded vertex depth field of the prism in a spherical rear surface.
Figure 10:
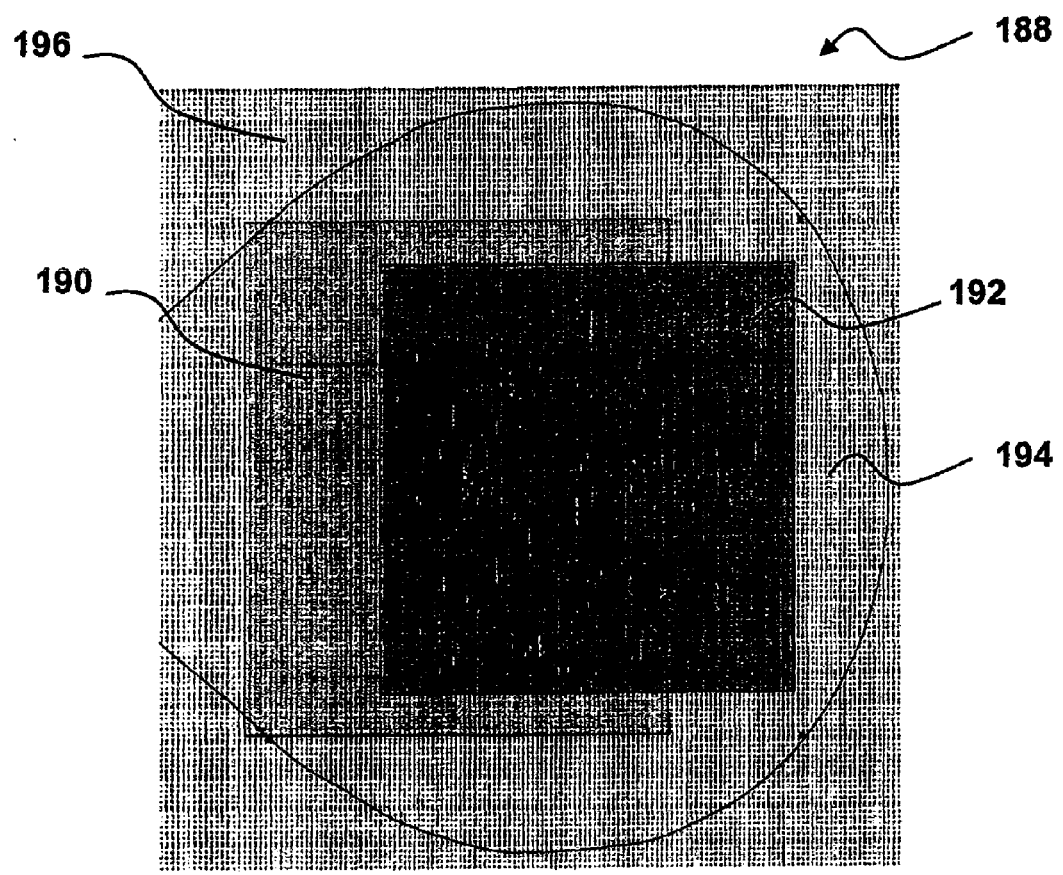
FIG. 10 vertex depth differences between sphere and prism.

In particular, the position of wear is characterized by the ocular center of rotation distance, the forward inclination or pantoscopic angle, the face form angle, the pupillary distance, the corneal vertex distance, the centration data, the object distance in the distance referent point and/or object distance in the near reference point. Furthermore, the position of wear comprises data relating to the arrangement and optionally the size of the display, as well as optionally the virtual distance in which the optical image of the display is to be formed.
Typical values in the use of the spectacle frame or the spectacles according to an average position of wear are:
ocular center of rotation distance approx. 27.9 mm, 28.5 mm or 28.8 mm;
forward inclination approx. 6° to 15°, preferably 7° to 9°;
face form angle approx. 0° to 35°, preferably 0° to 11°;
pupillary distance about 63 mm to 65 mm,
corneal vertex distance approx. 13 mm to 15 mm,
object distance in the distance reference point approx. 0 D;
object distance in the near reference point approx. −2.5 D.
FIG. 9 shows the embedded vertex depth field of the prism surface 188 in the spherical eye-side surface of a spectacle lens according to the second embodiment. FIG. 10 shows the vertex depth differences between sphere and prism and the vertex depth differences between the (virtual) continuation of the spherical surface of the major portion in the prism portion and the eye-side surface of the prism portion.

In FIGS. 9 and 10, the areas 190, 192 with the grey background designate the areas (optically active areas) of the prism surface 188 relevant for the optical imaging of the prism portion. The red area 194 shows the vertical depths that lie "in" the spherical surface, the green area 196 is the vertex depths that lie outside the spherical eye-side surface. The eye-side free-form surface of the prism portion or free-form prism surface 188 has been spanned:
at the points (−16, −5); (−16, +5) and (−27, −5) as well as (−27, 5) in the prism coordinate system;
and at the points (9.2, −5); (9.2; +5) and (20.2, −5) as well as (20.2, 5) in the lens coordinate system of the spherical surface of the major portion.
The base curve is for example 8D.
If the eye-side free-form surface of the prism portion 188 is continued with the given vertex depths outside the optically active areas 190, 192 (grey), the free-form prism surface is imbedded with a bend or kink in the eye-side surface of the prism portion at the red (194) to green (196) transition or the transition of the eye-side surface of the prism portion into the eye-side surface of the major portion. Outside the grey areas 190, 192, the red area 194 is to be kept as small as possible. Therefore, in the continuation of the prism surface 188 for one set of fabrication data, the surface of the prism portion is drawn "up" as steeply as possible.

Figure 11:
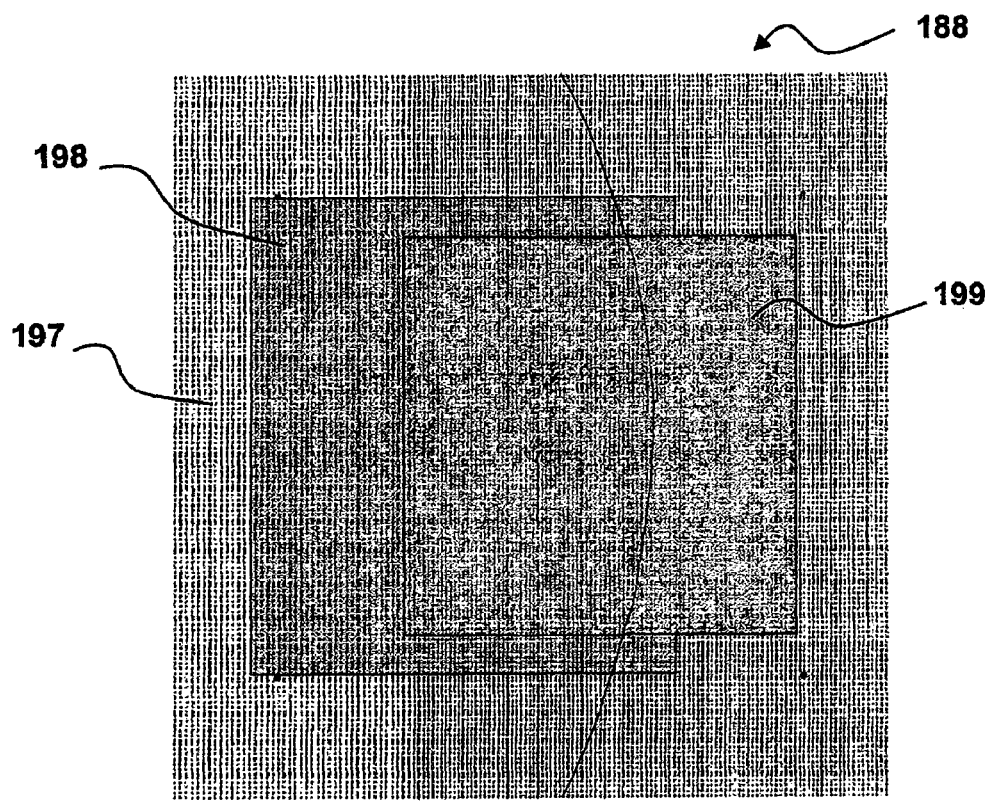
FIG. 11 angle difference in x direction between sphere and prism.

FIG. 11 shows the angle differences in the x direction between the (virtual) continuation of the spherical surface of the major portion in the prism portion and the eye-side free-form surface of the prism portion (prism surface). The x component of the surface normal of the prism surface is steeper in the red area 197 than that of the spherical surface. In other words, the prism surface is more flat in the direction of the center than the spherical surface in the red area 197. The edges are grinded in the finishing process and rounded in the polishing process.

Figure 12:
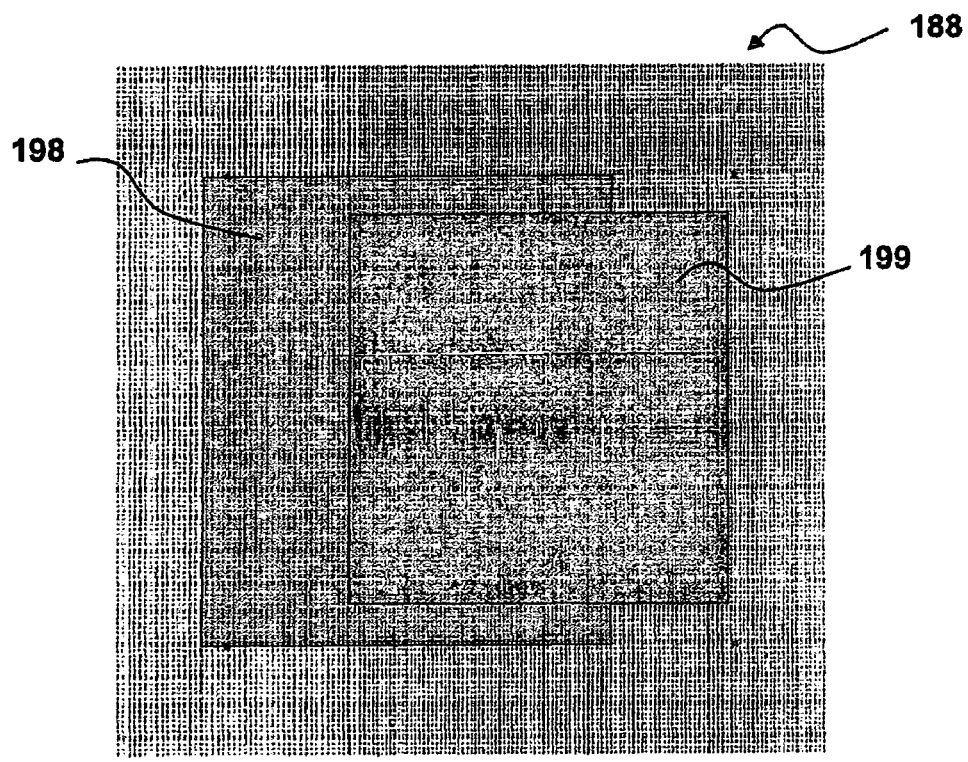
FIG. 12 angle difference in the y direction between sphere and prism.

FIG. 12 shows the angle difference in the x direction between the (virtual) continuation of the spherical surface of the major portion into the prism portion and the prism surface. The y component of the surface normal of the prism surface is always more flat than the sphere, wherein uniformity is only on the x axis. In other words, the surface quickly "emerges" from the sphere. The edges are grinded in the finishing step and rounded in the polishing step.

In FIGS. 11 and 12, the reference numerals 198, 199 designate the optically relevant or optically active areas.

Figure 13:
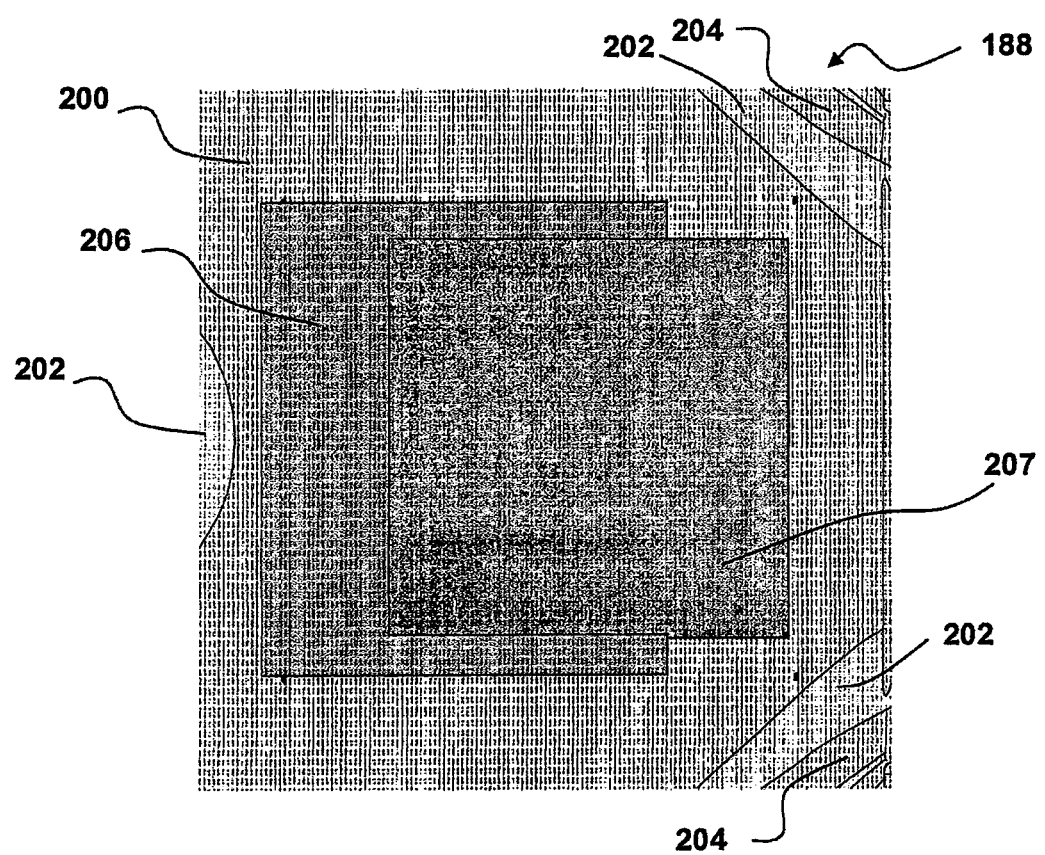
FIG. 13 surface astigmatism of the prism.

FIG. 13 shows the surface astigmatism of the prism surface. In the green area 200, the surface astigmatism is less than 4 D. In the orange area 202, the surface astigmatism of the prism surface is between 4 and 6 D. In the red area 204, the surface astigmatism of the prism surface is greater than 6 D. The surface astigmatism in the optically relevant or optically active areas 206, 207 is less than 4 D everywhere.

Figure 14:
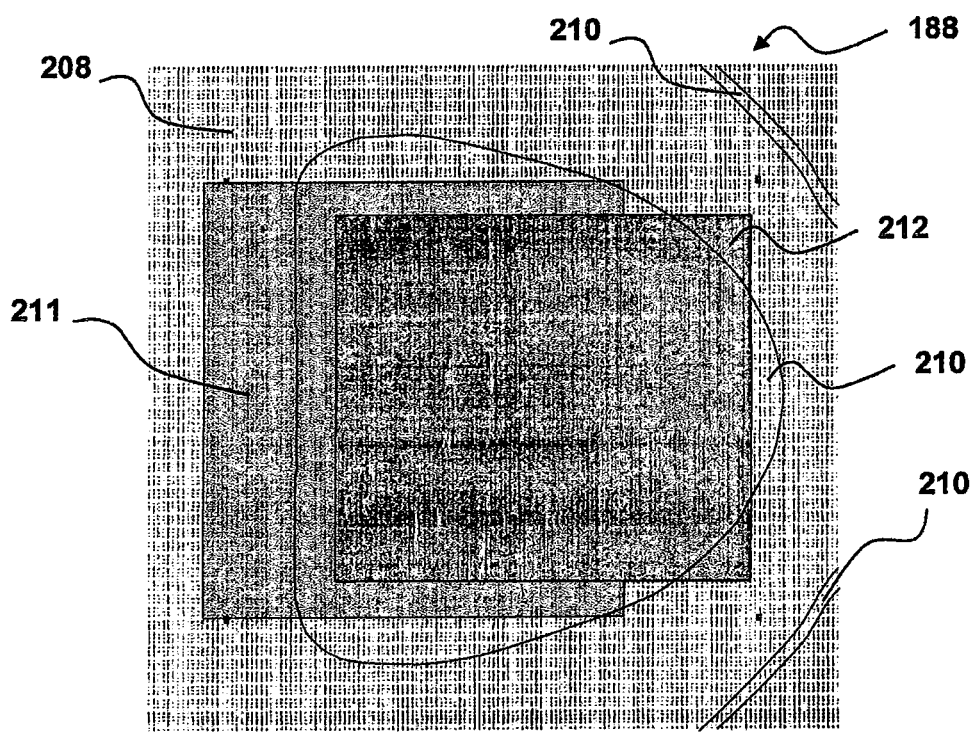
FIG. 14 change of refractive power of the prism in the x direction.

FIG. 14 shows the refractive power change of the prism surface in the x direction. The refractive power change of the prism surface in the x direction is less than 0.7 D/mm in the green area 208, between 0.7 D/mm and 1 D/mm in the orange area 210. The optically relevant areas 211, 212 lie almost entirely in the orange area 210 in which the refractive power change in the x direction is between 0.7 D/mm and 1 D/mm.

Figure 15:
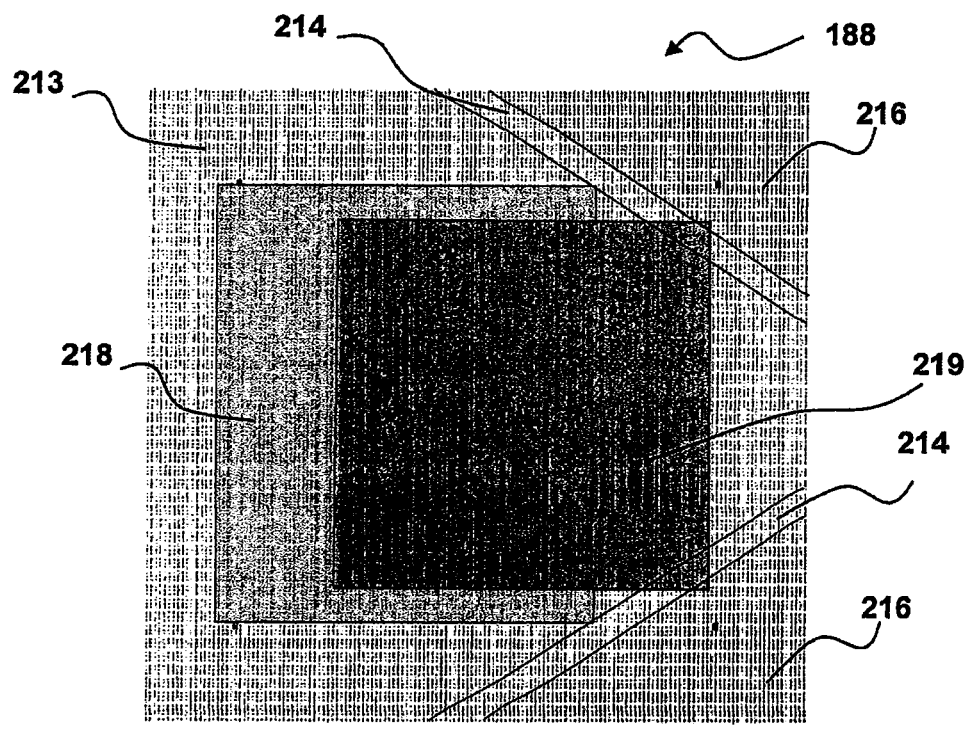
FIG. 15 change of refractive power of the prism in the y direction.

FIG. 15 shows the refractive power change of the prism surface in the y direction. The refractive power change in the y direction is less than 0.7 D/mm in the green area 213, between 0.7 D/mm and 1 D/mm in the orange area 214 and larger than 1 D/mm in the red area 216. The optically relevant areas 218, 219 lie almost entirely in the green 213 and orange 214 areas in which the refractive power change in the y direction is less than 0.7 D/mm and between 0.7 D/mm and 1 D/mm, respectively.

Figure 16:
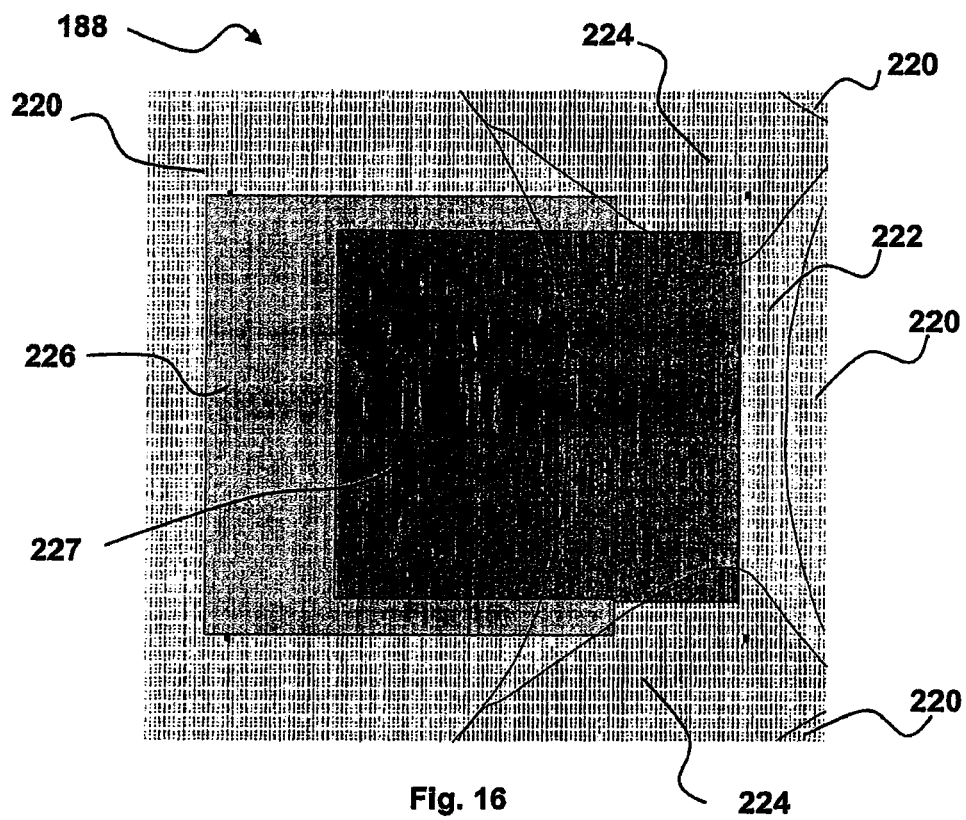
FIG. 16 change of astigmatism in the x direction.

FIG. 16 shows the astigmatism change of the prism surface in the x direction. The astigmatism change in the x direction is less than 0.5 D/mm in the green area 220, between 0.5 D/mm and 0.7 D/mm in the orange area 222 and larger than 0.7 D/mm in the red area 224. The optically relevant areas 226, 227 largely lie in the green 220 and orange 222 areas, their small red areas in the edge region of the total reflection surface.

Figure 17:
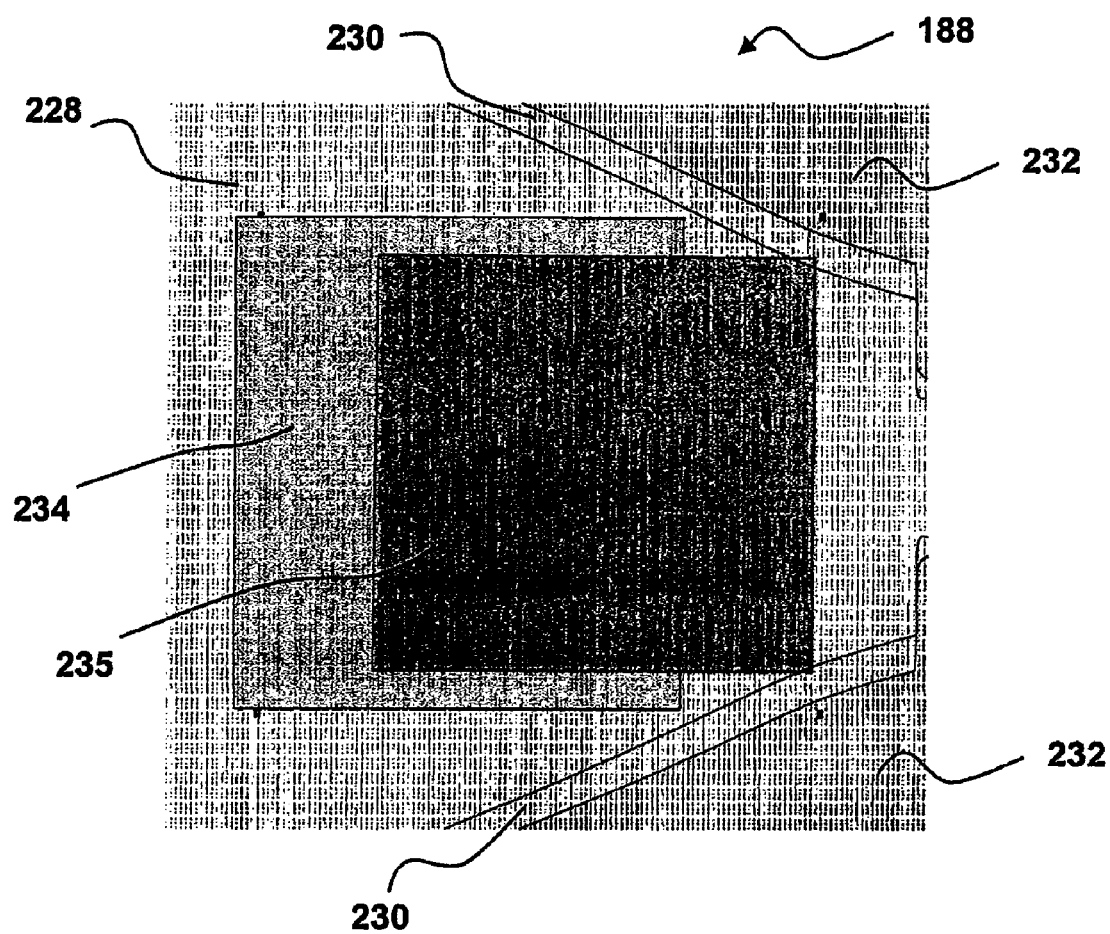
FIG. 17 change of astigmatism in the y direction.

FIG. 17 shows the astigmatism change of the prism surface in the y direction. The astigmatism change in the y direction is less than 0.5 D/mm in the green area 228, between 0.5 D/mm and 0.7 D/mm in the orange area 230 and larger than 0.7 D/mm in the red area 232. The optically relevant area 234, 235 lie almost entirely in the green area 228 in which the astigmatism change of the prism surface in the y direction is less than 0.5 D/mm.

The extrapolation of the prism surface data or the surface data of the free-form surface of the prism portion may for example take place as follows: according to a first approach, a surface is extrapolated toward the origin of the spherical surface. To this end, the vertex depth field is converted to polar coordinates. Route sections are optimized along equidistant radii, wherein the vertex depth (stroke of the turning lathe), the first derivative thereof (inclination of the surface corresponds to the speed of the stylus of the lathe), the second derivative thereof (curvature corresponds to the acceleration of the stylus of the lathe) and the third derivative thereof (change of curvature—corresponds to the change of acceleration of the stylus of the lathe) are taken into account. Preferably, the second and third derivatives are kept as small as possible. The spectacle lens is merely blocked once.

Alternatively, according to a second approach, the prism surface is reflected on the "inner side" and the spectacle lens is blocked prismatically. In particular, a surface is extrapolated towards the center of the reflection of the prism surface. To this end, the vertex depth field is converted to corresponding polar coordinates. Route sections are optimized along equidistant radii.

The extrapolation or calculation or optimization of the prism surface is preferably performed such that the above-mentioned default values and/or threshold values, which are present for production engineering reasons, are complied with.

FURTHER EXAMPLES

In the following, further examples of spectacle lenses are described, wherein the spectacle lenses each have a composite object-side surface and a composite eye-side surface.

For example, the object-side surface of the major portion may be a spherical surface with a radius of 80 mm. The eye-side surface of the spectacle lens may then be a surface composed of the eye-side surface of the major portion and the eye-side surface of the prism portion, as explained above. Preferably, the eye-side surface of the prism portion is a free-form surface continuously adjoining the eye-side surface of the major portion in the horizontal direction with respect to the radius of curvature. Preferably, in the vertical direction, the surface radius is matched to the surface radius of the eye-side surface of the major portion to approx. 50 mm. The matching of the surface radius in the vertical direction preferably takes place within a vertical section of approx. 4 mm, particularly preferably less than 4 mm.

In another example, the object-side surface of the major portion is a spherical surface with a radius of 80 mm. The eye-side surface of the spectacle lens is composed of the eye-side surface of the major portion formed as the prescription surface and the eye-side surface of the prism portion or prism surface, which is recessed therein with resulting bend.

In a further example, the eye-side surface of the major portion is a spherical surface with a radius of 54 mm. In the vertical direction, the eye-side free-form surface of the prism portion is continuously adjoining the eye-side surface of the major portion with respect to the radius of curvature. In the horizontal direction, the surface radius is adjusted to approx. 80 mm, for which approx. 4 mm, preferably less than 4 mm are necessary. Alternatively, the eye-side surface of the spectacle lens may be composed of the eye-side surface of the major portion formed as the prescription surface and the prism surface recessed therein with resulting bend.

According to a further embodiment, the front surface of the major portion is a spherical surface with a radius of for example 66.6 mm. The eye-side free-form surface of the prism portion is matched to the surface radius of the eye-side surface of the major portion in the horizontal and vertical directions with respect to the surface radius, for which 4 mm, preferably less than 4 mm are necessary.

The front surface of the spectacle lens may as well be a toric surface. According to a further embodiment, the front surface is a toric surface with main radii of curvature of for example 80 and 50 mm ($R_h$=80 mm, $R_v$=50 mm). The eye-side free-from surface of the prism portion is continuously adjoining the eye-side surface of the major portion and the horizontal and vertical directions with respect to the radius of curvature.

The production of a spectacle lens according to the first or the second embodiment, with an object-side surface of the prism portion integrated in the object-side surface of the spectacle lens as a "near portion", may take place by means of the production methods developed for the production of bifocal spectacle lenses. In this respect, reference is e.g. made to the book "Optik und Technik der Brille" von Hans Diepes und Ralf Blendowske, Optische Fachveröffentlichung GmbH, Heidelberg, 2002, which may also be referred to for the sake of explanation of all technical terms not further described in detail in this application. Likewise, reference is made to the book "Die Optik des Auges und der Sehhilfen" von Dr. Roland Enders, Herausgeber: Zentralverband der Augenoptiker, Düsseldorf, 1995.

For example, in a first step, a blank or lens blank or main body with an object-side surface is provided, which surface exhibits a concave recess for receiving a prism body. The main body may for example be manufactured by means of a casting method. In the concave recess, a prism body is inserted and fixedly connected to the major portion (e.g. by means of bonding or melting). The prism body may be formed of glass or plastics with a refractive index higher than the refractive index of the glass or plastics of the main body. After connection of the main body to the prism body, the object-side surface may optionally be machined further, e.g. grinded and/or polished. The eye-side surface may be finished in a further step e.g. by means of CNC-machines.

Third Embodiment

Object-side surface of the spectacle lens one-part surface extending across the major and the prism portion, i.e. no formation of a near portion;

Eye-side surface of the spectacle lens prism portion integrated as "near portion", i.e. a complex surface composed of eye-side surfaces of the major portion and the prism portion, the eye-side surface of the prism portion preferably is a free-form surface; the production of the spectacle lens takes place by means of technologies developed for individual spectacle lenses (ILT technologies).

In the first and second embodiments, the object-side surface is a composite (complex) surface having a base or major portion zone and a prism zone, wherein the design of the object-side surface of the spectacle lens differs in the major portion zone and in the prism zone. In other words, in the first and second embodiments, the object-side surface of the spectacle lens is formed as a complex surface composed of the object-side surface of the major portion and the object-side surface of the prism portion.

However, according to a third embodiment, the object-side surface of the spectacle lens may be formed for example as a spherical/aspherical, toric/atoric or progressive surface extending across the major portion and the prism portion.

For example, the object-side surface of the spectacle lens may be a spherical or a rotationally symmetric aspherical surface. The bending of the object-side surface of the spectacle lens may for example be selected in a conventional manner roughly depending on the spherical, toric and/or prismatic power (i.e. prescription power) to be achieved and/or with respect to a cosmetic point of view. Likewise, the bending of the second surface may be selected with respect to a production-engineering point of view.

Like in the second embodiment, the eye-side surface of the spectacle lens is a complex surface composed of the eye-side surface of the major portion and the eye-side surface of the prism portion. Depending on the dioptric power of the spectacle lens to be achieved or the dioptric power of the major portion to be achieved, the eye-side surface of the major portion may be formed as a spherical or rotationally symmetric aspherical (a non-astigmatic single-vision spectacle lens), a toric or atoric (astigmatic single-vision spectacle lens) or a progressive surface (progressive spectacle lens). The eye-side surface of the prism portion is a free-form surface which—as described above in connection with the calculation or optimization of the eye-side free-form prism surface of the spectacle lens according to the second embodiment—is calculated and optimized so as to obtain the predetermined deflection of the rays coming from the display. In the calculation or optimization of the eye-side free-form surface of the prism portion, in particular a predetermined average (e.g. standardized) or a predetermined individual position of wear of the spectacle lens or the spectacles and the use of the spectacles in a predetermined average or individual position of wear are taken into account.

Preferably, the eye-side surface of the prism portion is once, preferably twice, continuously differentiably adjoining the eye-side surface of the major portion in the vertical and/or horizontal direction.

Figure 18:
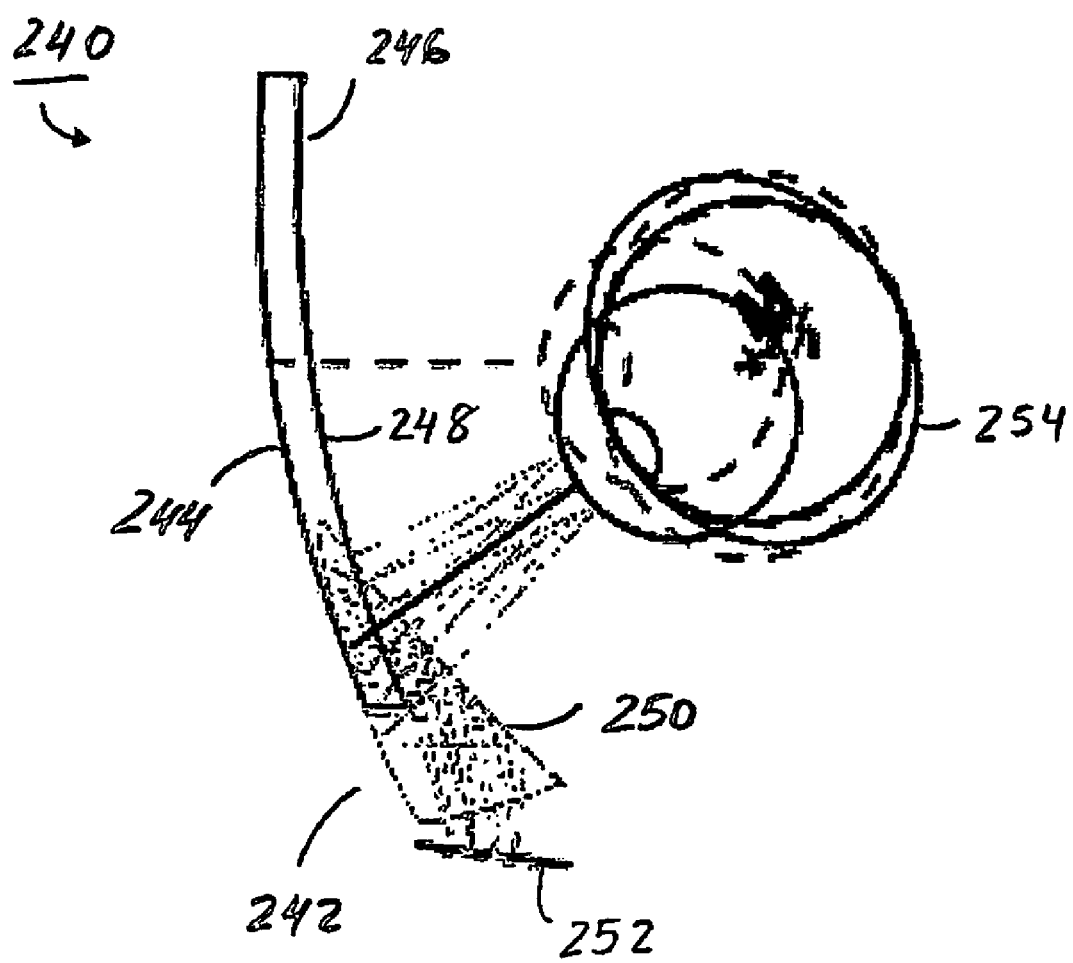
FIG. 18 spectacle lens with an integrated prism portion according to the third embodiment.

FIG. 18 shows a spectacle lens 240 with an integrated prism portion 242 according to the third embodiment in a predetermined position of wear of the spectacle lens.

The object-side surface 244 of the spectacle lens may be a spherical surface. The eye-side surface 246 of the spectacle lens is a complex surface composed of the eye-side surface 248 of the major portion and the eye-side free-form surface 250 of the prism portion, as described above. Likewise, FIG. 18 shows the ray path of the rays coming from a display 252 through the prism portion of the spectacle lens when the eye 254 looks through the prism portion.

As described above, a fully reflecting or semi-permeable reflection layer may be applied to the object-side surface of the spectacle lens in the area of the prism portion. The eye-side surface of the prism portion 250 is once, preferably twice, continuously differentiably adjoining the eye-side surface of the major portion 248 in the vertical and horizontal direction.

Preferably, the spectacle lens according to the third embodiment is produced from semi-finished lenses with a pre-fabricated object-side surface, wherein after collection of the data of the spectacle lens, the complex eye-side surface is calculated and optimized for a predetermined average or individual position of wear and a predetermined and average or individual arrangement of the display. The fabrication of the complex eye-side surface of the spectacle lens is then performed by means of numerically controlled CNC machines according to the surface data of the eye-side surface of the spectacle lens. It is an advantage of this method that the spectacle lens exhibits very good cosmetical properties, since the front surface is a simple continuous surface. It is a further advantage that in the production of spectacle lenses according to the third embodiment, use may largely be made of the Rodenstock ILT ("Individual Lens Technology") technologies employed in the production of progressive lenses and single-vision spectacle lenses.

Fourth Embodiment

Object-side surface of the spectacle lens: one-part surface extending across the major portion and the prism portion, i.e. no formation of a near portion;

Eye-side surface of the spectacle lens prism portion integrated as "near portion", i.e. a complex surface composed of eye-side surfaces of the major portion and the prism portion; in contrast to the third embodiment, the spectacle lens is produced from a main body and a prism body of glass or plastics, according to production methods developed for bifocals spectacle lenses.

In a spectacle lens according to a fourth embodiment, the prism portion is integrated in the eye-side surface of the spectacle lens as the near portion. Like in the spectacle lens according to the third embodiment, the spectacle lens according to the fourth embodiment has a convex, object-side surface extending across the major portion and the prism portion. Like in the third embodiment, this surface may be a spherical or rotationally symmetric aspherical object-side surface. Alternatively, the object-side surface may represent the prescription surface of the spectacle lens.

The eye-side surface of the spectacle lens is a complex surface composed of the eye-side surface of the major portion and the eye-side surface of the prism portion. In contrast to the third embodiment, the spectacle lens is produced from a main body and a prism body of glass or plastics by means of the production methods developed for bifocal spectacle lenses.

Figure 19A:
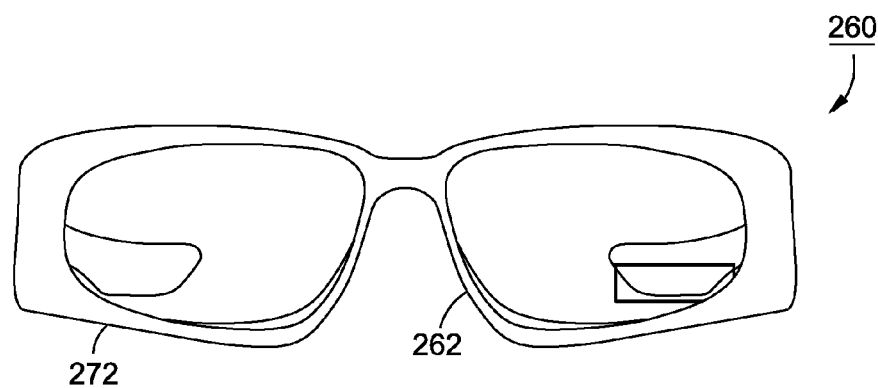
FIG. 19a front view.
Figure 19B:
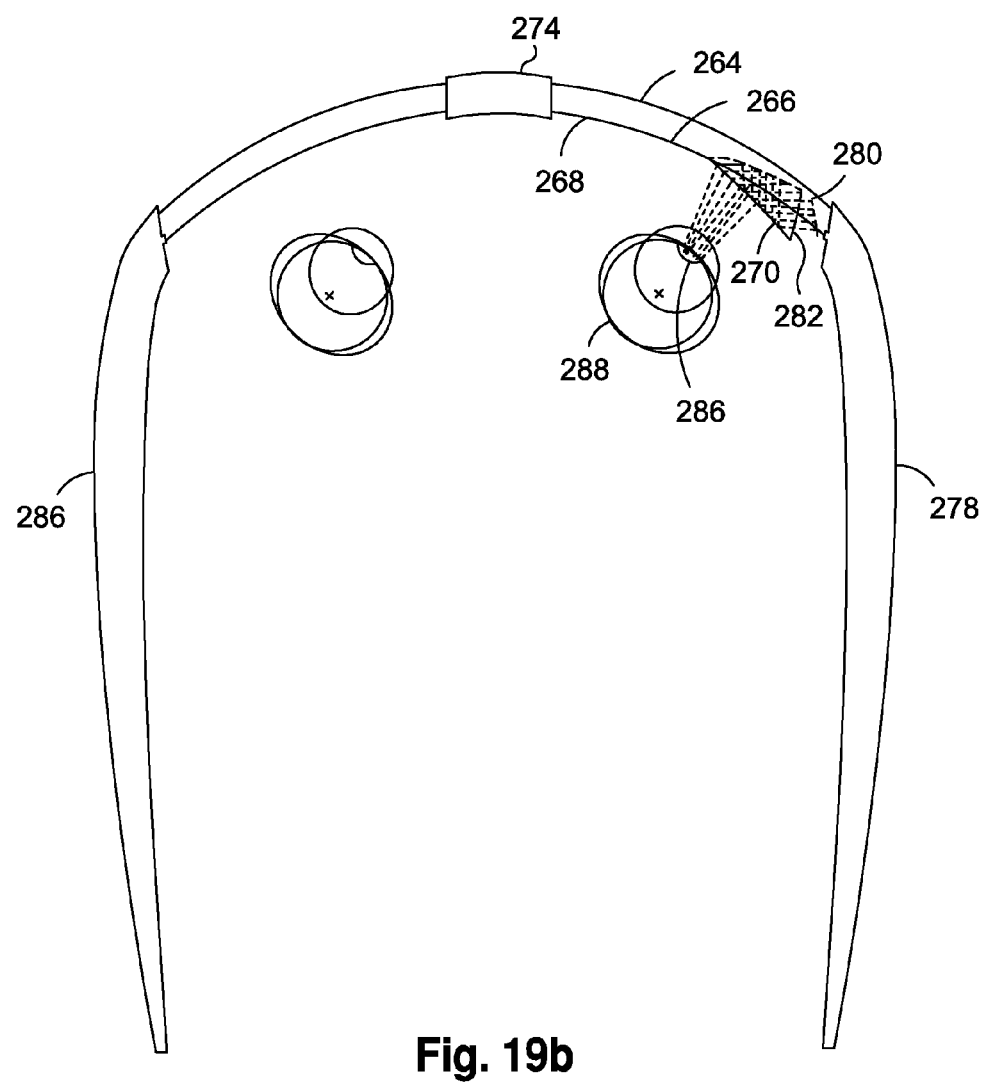

FIG. 19 shows spectacles 260 with a spectacle lens 262 with an integrated prism portion according to the fourth embodiment, wherein FIG. 19a is a front view and FIG. 19b is a top view of the spectacles located in the position of wear in front of the eyes of the spectacle wearer.

The object-side surface of the spectacle lens 264 may be a spherical surface. The eye-side surface 266 of the spectacle lens is a complex surface composed of the eye-side surface 268 of the major portion and the eye-side surface 270 of the prism portion.

The spectacles 260 have a spectacle lens 272 with a bridge portion 274 and two spectacle sides 276 and 278. A display 280 is integrated in the spectacle frame.

The display 280 is arranged such that the light rays coming from the display, after entering through the side surface 282 of the prism portion, are reflected at least once, preferably several times, at the eye-side surface of the prism portion in the direction of the object-side surface of the prism portion by means of total reflection, and are reflected (back) on the object-side surface 284 of the prism portion in the direction of the eye-side surface 270 of the prism portion. After exiting through the eye-side surface of the prism portion 270, the rays pass through the pupil 286 of the respective eye 288 of the spectacle wearer, so that an optical image of the display 280 is formed in a predetermined finite or infinite virtual distance.

The spectacle lens may be produced from a main body and a prism body of glass or plastics by means of production methods developed for bifocal spectacle lenses. The refractive indices of the respective base and prism bodies may be different, in particular, the refractive index of the prism body may be larger than the refractive index of the main body. As has been explained above with respect to the fabrication of spectacle lenses having a prism portion integrated in the front surface, the spectacle lens may be produced by means of a casting method.

For example, in a first step, a blank or lens blank or main body with a convex spherical, object-side surface and a concave eye-sight surface is fabricated by means of a casting method. The eye-side surface has a recess for receiving the prism body. The prism body is inserted in the recess and fixedly connected to the major portion (e.g. by means of bonding or melting). After connection of the main body to the prism body, the eye-side surface may optionally be processed further, e.g. grinded and/or polished.

Figure 20:
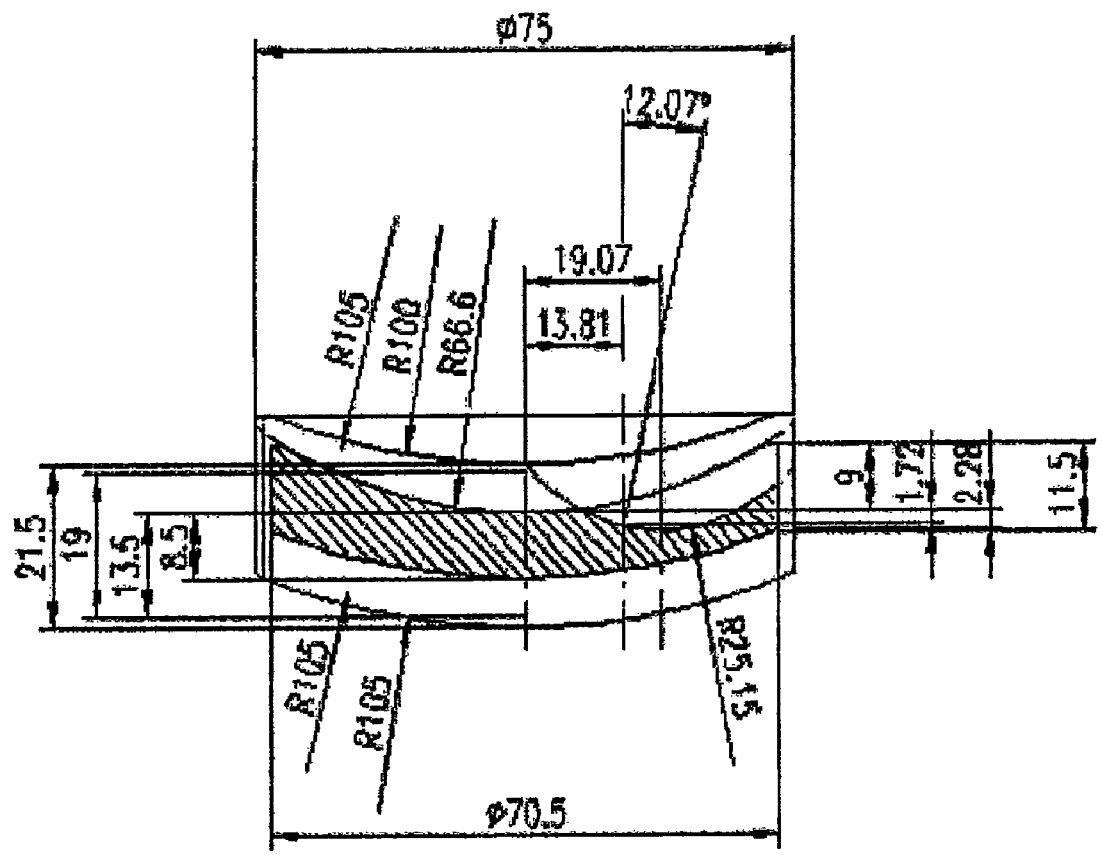
FIG. 20 casting mould for a spectacle lens with integrated prism portion according to the invention.

FIG. 20 shows an example of a casting mould that can be used in the production of spectacle lenses with a prism portion integrated in the object-side surface of the spectacle lens. For example, the casting mould has two radii of 66.6 mm and 25.15 mm for the prism portion. The further dimensions of the casting mould can be taken from FIG. 20.

In particular, FIG. 20 shows different stages of the casting mould before the insertion of the addition parts, after fusion of the addition parts up to the final shape. This is advantageous and necessary in order to be able to use existing moulds for fusion so that the casting mould does not deform upon application of heat.

Figure 21A:
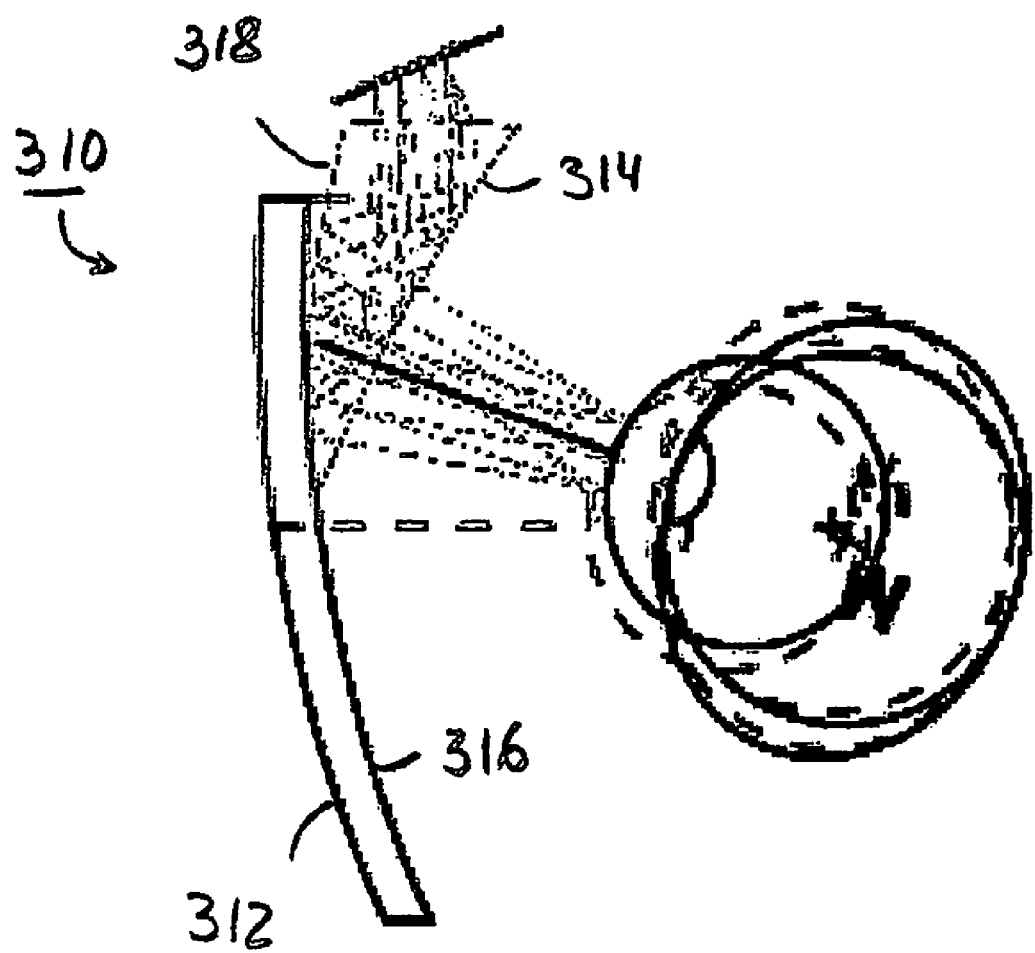
FIG. 21a ray path through the prism portion in the position of wear of the spectacle lens.
Figure 21B:
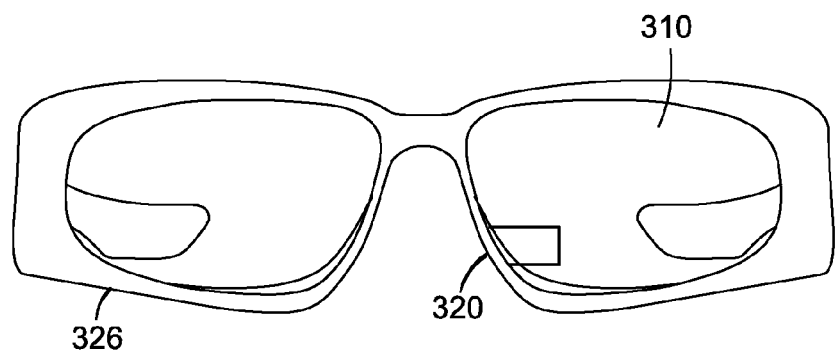
FIG. 21b front view.
Figure 21C:
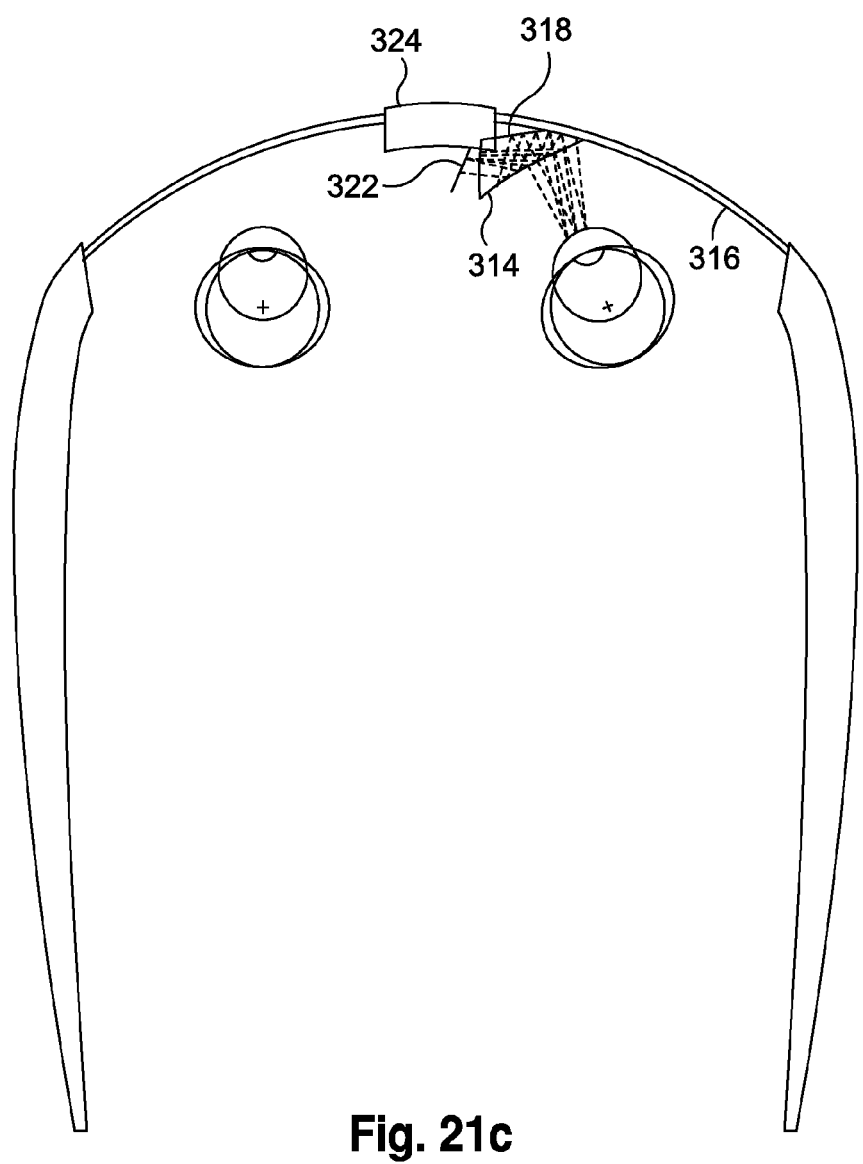

A further embodiment of a spectacle lens according to the invention is shown in FIGS. 21a to 21c, wherein FIG. 20a shows the ray path through the prism portion in the position of wear of the spectacle lens, FIG. 21b is a front view of spectacles with a preferred spectacle lens according to the invention, and FIG. 21c shows a top view of the spectacles in the position of wear and correspondingly the ray path through the prism portion in the position of wear of the spectacle lens.

Like in the third and fourth embodiments, the spectacle lens 310 has a spherical front surface 312. The eye-side surface of the spectacle lens is composed of the eye-side surface 314 of the major portion and the eye-side surface 316 of the prism portion.

The prism portion with a spherical object-side surface 318 and an eye-side free-form surface is glued to the eye-side surface of a semi-finished spectacle lens (or a spectacle lens with a finished object-side surface and optionally a finished eye-side surface). In the spectacle lens shown in FIG. 21b, the prism portion 320 is arranged horizontally in the nasal direction and vertically displaced downward.

In the spectacles shown in FIGS. 21b and 21c, the display 322 is preferably arranged in a bridge portion 324 of the spectacle frame 326.

Alternatively, in the eye-side surface, a cavity or for example a recess for receiving the prism portion may be milled with a corresponding radius. Subsequently, the prism portion is glued into the cavity or recess.

Figure 22:
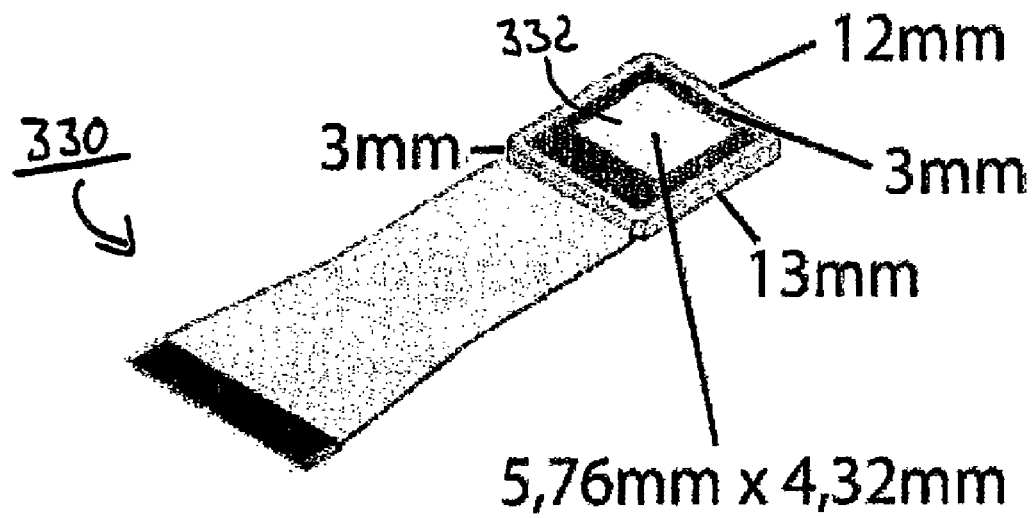
FIG. 22 display.

FIG. 22 shows a display 330 particularly suitable to be integrated in the spectacle frame of a preferred spectacle lens according to the invention. The display shown in FIG. 22 is a polymer OLED colour microdisplay. The display has the following dimensions: display: 13 mm×12 mm×3 mm (width×length×height or thickness). The active surface 332 of the display is approx. 5.76 mm×4.32 mm. Preferably, the weight of the display is equal to or less than 5 g.

As described above, at least one power source, e.g. a battery, and/or a driving device for driving the display may additionally be integrated in the spectacle frame. The display may e.g. be driven by means of radio transmission. Alternatively, a flat cable connection may be provided between the driving device and the display. Preferably, the weight of the driving device is less than 10 g. The position of the driving device may for example be variable in the side. The driving device for driving the display exemplarily realized as a chip is preferably equal to or less than 21 mm×12 mm×4 mm (width×length×height).

The power source or battery is to have a dimension as small as possible, preferably equal to or less than 30 mm×11 mm×4 mm. The battery may for example be arranged in one of the sides of the spectacle frame, wherein a cable connection optionally exists between the battery and the display arranged in the other side and the driving device. Preferably, the weight of the battery is equal to or less than 2 g.

As described above, preferably all components (including display, power source, driving device) are integrated in the spectacles (or in the spectacle lenses and in the spectacle frame), so that the spectacles represent an autarkic system, i.e. a system without cable connection to other systems.

Preferably, the spectacles serve as a display device, i.e. as an interface to arbitrary terminal devices. Preferably, the connection to the terminal devices is achieved by means of radio transmission.

In the above embodiments, the spectacles merely have an inventive spectacle lens with an integrated prism portion. However, the spectacles may as well have two inventive spectacle lenses with respectively integrated prism portions, e.g. in order to form a three-dimensional virtual stereo image. The two prism portions are then preferably arranged such that a stereo image is formed.

Further preferred embodiments of the spectacles according to the invention are shown in FIGS. 23 to 28.

Figure 23:
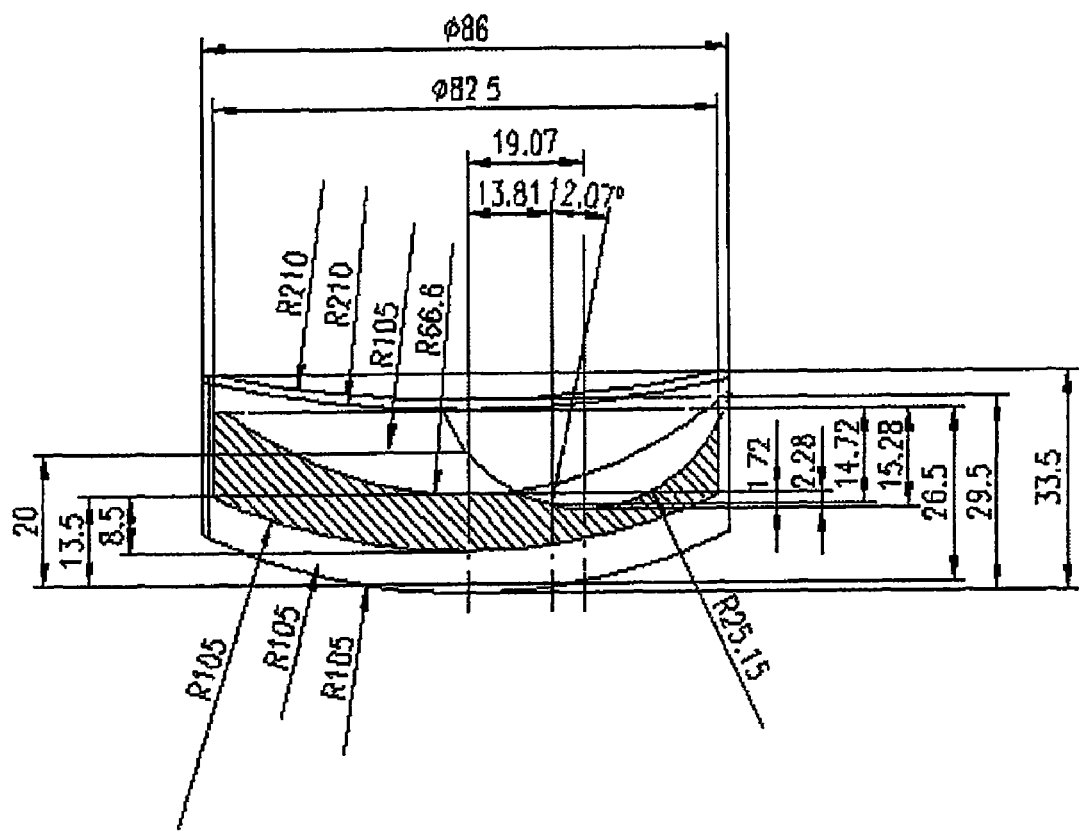
FIG. 23 casting mould for a preferred spectacle lens according to the invention, FIGS. 24(a-c) embodiment of a spectacle lens.

In particular, FIG. 23 shows a further example of a casting mold that can be used in the fabrication of spectacle lenses with a prism portion integrated in the object-side surface of the spectacle lens. The casting mould for example, comprises two radii of 66.6 mm and 24.15 mm for the prism portion. The further dimensions of the casting mould can be taken from FIG. 23.

Figure 24A:
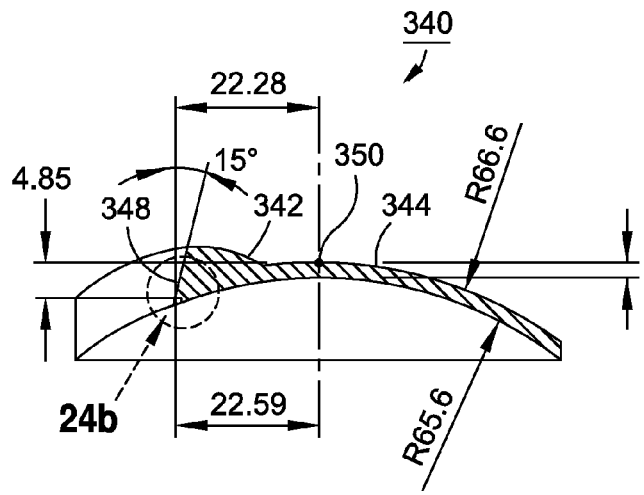
FIG. 24a shows a cross-section through the spectacle lens.
Figure 24B:
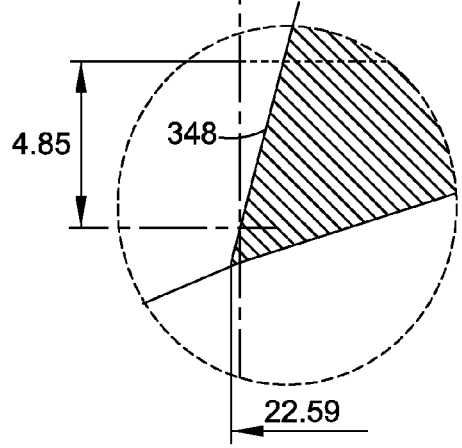
Figure 24C:
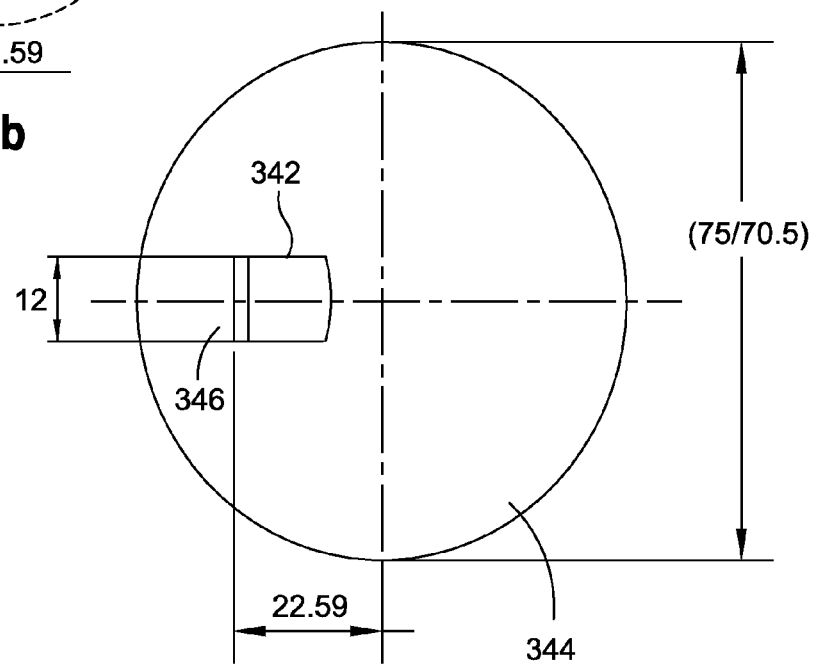
FIG. 24c shows a front view.

FIGS. 24a to 24c show an embodiment of a preferred spectacle lens 340 with a prism portion 342 and a base or major portion 344. FIG. 24a shows a view of a cross-section through the spectacle lens along the line connecting the two permanent markings of the spectacle lens, FIG. 24b shows an enlarged view of the section "Z" of the spectacle lens shown in FIG. 24a. FIG. 24c shows a front view of the object-side surface of the spectacle lens.

The diameter of the raw-round spectacle lens is 75 mm. Alternatively, the spectacle lens may have other diameters, e.g. 70.5 mm. The radii of curvature of the spherical surfaces of the major portion 344 are 66.6 and 65.6 mm. The center thickness of the spectacle lens is 2 mm. The spectacle lens has a cutout 346 with a width of 12 mm. The angle between the side surface 348 of the spectacle lens in the prism portion (side surface of the prism portion) and the straight line passing parallel to the surface normal of the front surface of the spectacle lens in the geometric center 350 of the raw-round spectacle lens is 15°. The further dimensions of the spectacle lens can be taken from FIGS. 24a to 24c.

Figure 25:
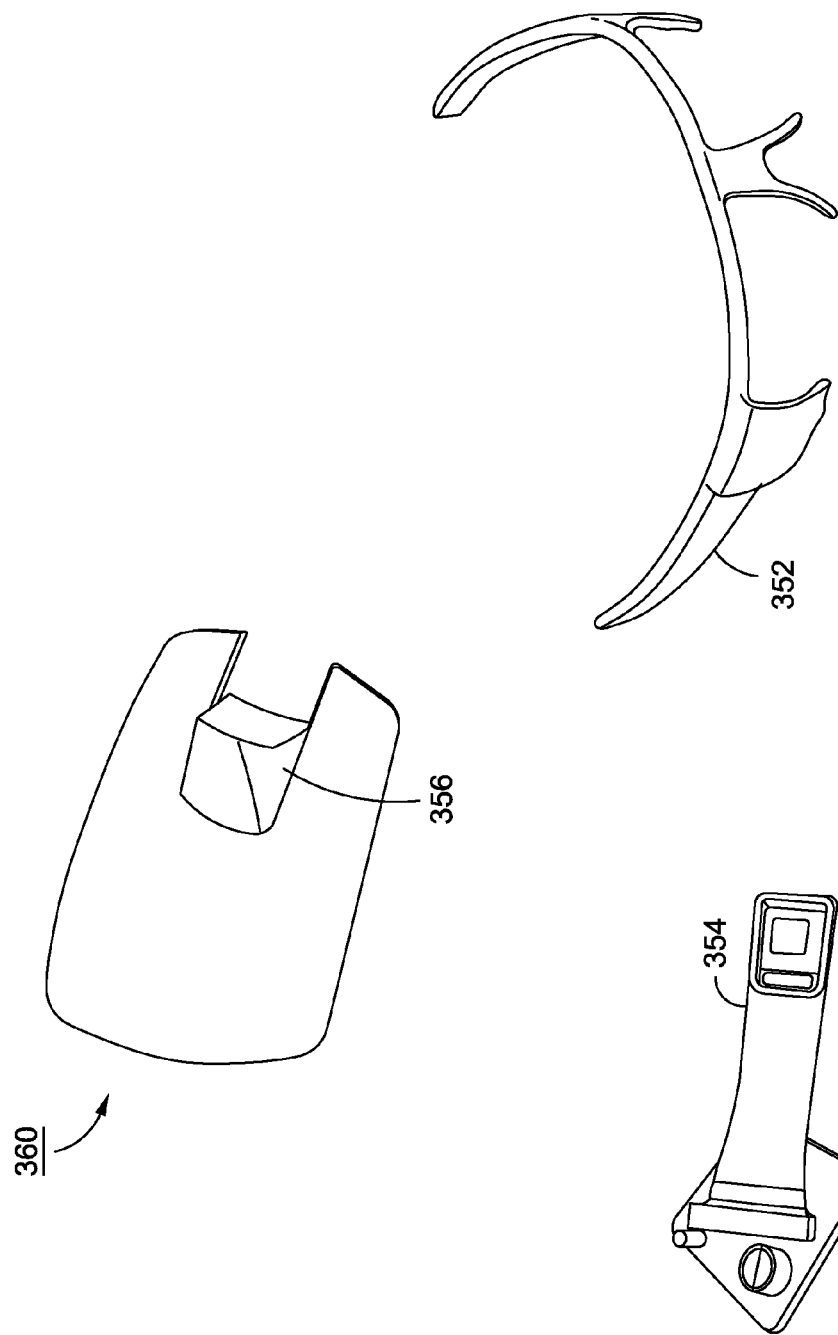
FIG. 25 embodiment of a spectacle frame.

FIG. 25 shows individual components—spectacle frame 352, display 354, and spectacle lens 356, of preferred spectacles 360 according to the invention. The spectacle frame is a so-called sports frame with a relatively large face form angle. As described above, the display 354 is a miniaturized display with integrated power source and electronics for wireless or radio transmission.

The spectacle lens is a spectacle lens according to the second embodiment with an eye-side free-form surface of the prism portion, which is fabricated by means of free-form technology. The spectacle lens is correspondingly edged.

Figure 26:
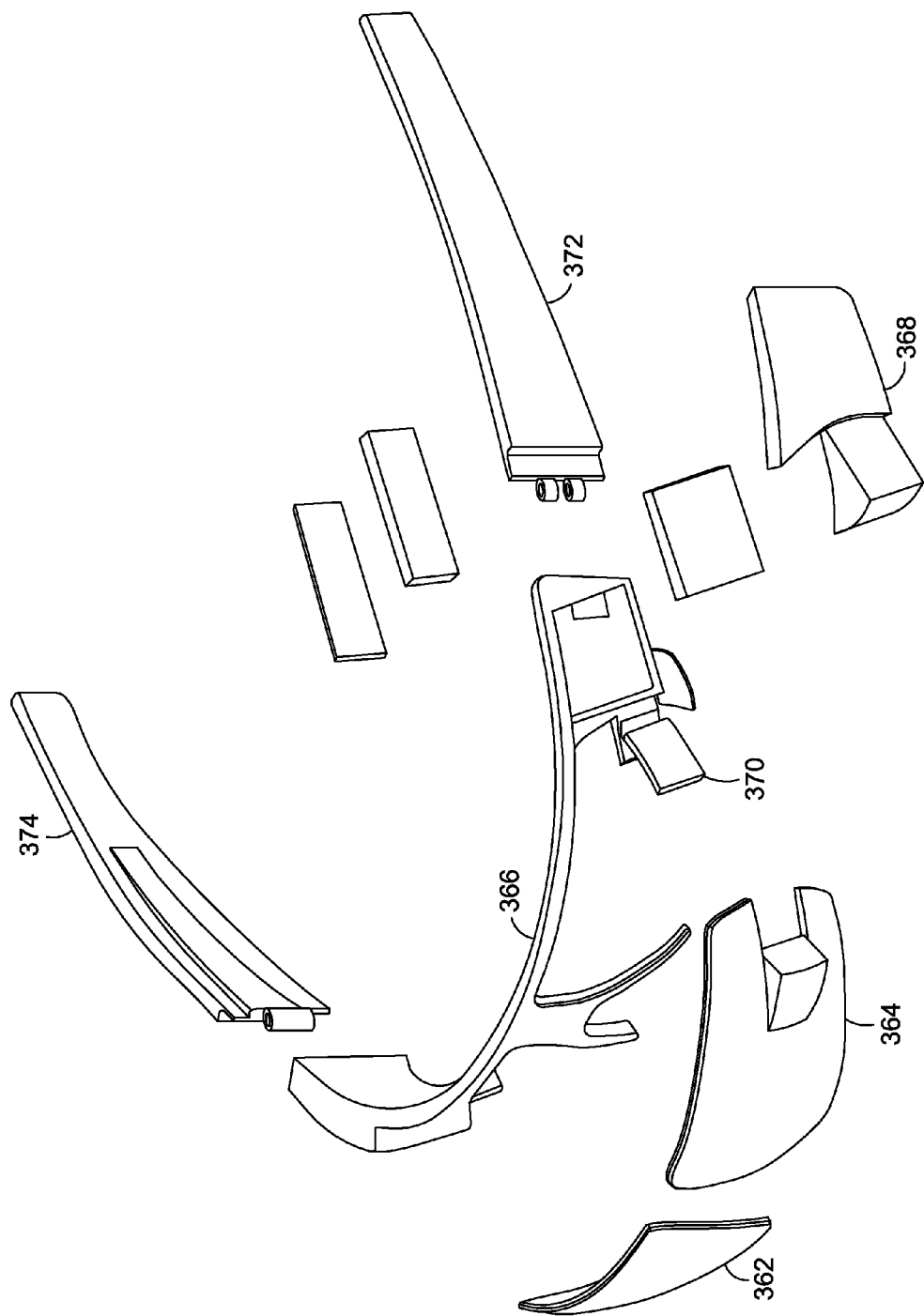
FIG. 26 exploded view of an embodiment of a spectacle frame with spectacle lenses.

FIG. 26 shows an exploded view of the components of an embodiment of preferred spectacles. In FIG. 26, the reference numerals 362 and 364 designate the two spectacle lenses, the reference numeral 366 designates the spectacle lens receiving portion of the spectacle frame, the reference numeral 368 designates the prism receiving portion of the spectacle frame, the reference numeral 370 designates the display, the reference numerals 372 and 374 designate the spectacle side. The display 370 is integrated in the prism receiving portion 368.

Figure 27:
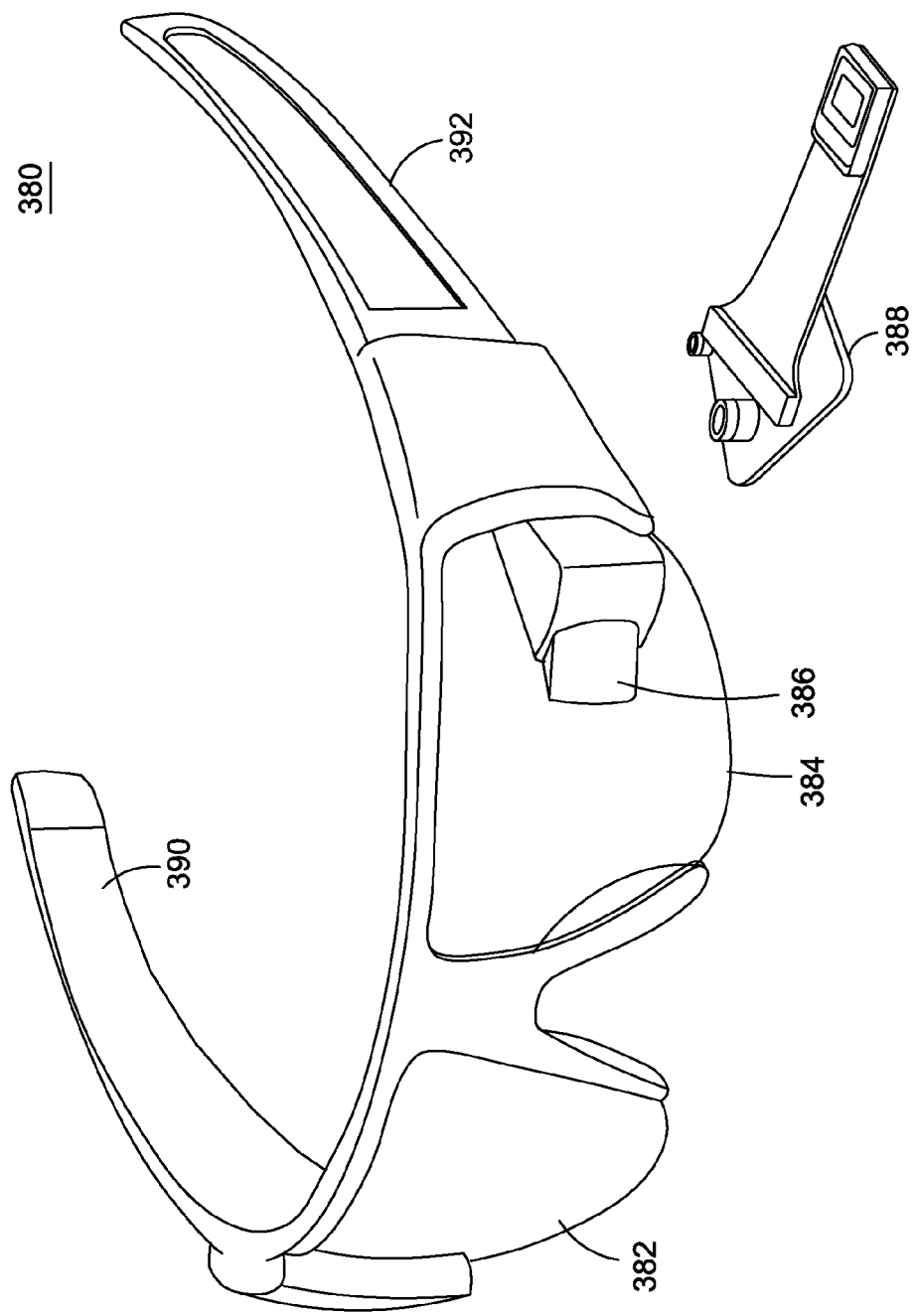
FIG. 27 embodiment of preferred spectacles according to the invention.

FIG. 27 shows an example of preferred spectacles 380 according to the invention. In FIG. 27, the reference numerals 382 and 384 designate the two spectacle lenses, the reference numeral 386 designates the prism portion, the reference numeral 388 designates the display, the reference numerals 390 and 392 designate the spectacle sides.

Figure 28:
FIG. 28 example of a visual image through preferred inventive spectacles according to an embodiment.

FIG. 28 shows an example of a visual image through preferred inventive spectacles according to an embodiment.

LIST OF REFERENCE NUMERALS

FIG. 1
10 prism
12 object
14 side or entrance surface
16 reflection surface
18 exit surface
20 image of the object
FIG. 2
22 prism portion
24 display
26 side surface of the prism portion
28 object-side surface of the prism portion
30 eye-side surface of the prism portion
32 pupil
34 eye-side surface of the major portion
FIGS. 3a, 3b
36 spectacle lens
38 object-side surface of the spectacle lens
40 major portion zone of the object-side surface
42 prism zone of the object-side surface
44 prism portion
45 major portion
46 cutout
48 eye-side surface of the spectacle lens
50 radius of curvature of the spherical object-side surface of the major portion
51 center
52 radius of curvature of the spherical eye-side surface of the major portion
53 center
54 radius of curvature of the spherical object-side surface of the prism portion
55 center
56 step
58 surface normal of the object-side surface
59 geometric center of the front surface of the spectacle lens
60 surface normal of the object-side surface of the prism portion
62 geometric center of the object-side prism surface (or geometric center of the prism portion)
64 angle
FIGS. 4a, 4b
70 spectacles
72 spectacle frames
74 spectacle lens
75 prism portion
76, 78 spectacle ear frame
80 bridge portion
82 display
84 side surface of the prism portion
86 object-side surface of the prism portion
88 eye-side surface of the prism portion
89 object-side surface of the major portion
90 pupil
92 eye
94 surface normal of the object-side surface of the major portion
95 geometric center of the front surface of the spectacle lens
96 surface normal of the object-side surface of the prism portion 97 geometric center of the object-side prism surface
98 angle
100 line connecting the pupil centers
102, 104 demarcation lines of the bridge portion
106 power source
108 driving device
FIGS. 5a to 5c
110 visual axis
112 center of the (spherical) front surface of the major portion
114 surface normal of the front surface through the geometric center of the spectacle lens
117, 119, 121, 123
 connecting lines of the two pupils
116, 118, 120, 122, 124
 zero directions of sight with different sight deviations
126 geometric center of the spectacle lens
128 penetration point of the deviated visual axis with the object-side surface of the spectacle lens
130 ocular center of rotation
FIGS. 6a, 6b
140 spectacles
142 spectacle lens
144 prism portion
146 major portion
148 fitting point
150 virtual line connecting the pupil centers
152, 154 pupil centers
156 line perpendicular to the line
160 part of the spectacle frame extending across the prism portion
161 display
162 bridge portion
164, 166 spectacle side
FIG. 8
170 spectacles
172 spectacle lens
174 display
176 prism portion
178 eye
180 side surface of the prism portion
182 object-side surface of the prism portion
184 object-side surface of the major portion
186 eye-side surface of the major portion
188 eye-side surface of the prism portion
FIGS. 9, 10
190, 192 optically active area of the prism surface
194 vertex depths lying "in" the spherical surface
196 vertex depths lying outside the spherical surface
FIG. 11, 12
197 area of the prism surface in which the x component of the surface normal of the prism surface is steeper than that of the spherical surface
198, 199 optically active areas of the prism surface
FIG. 13
200 area of the prism surface in which the surface astigmatism of the prism surface is less than 4 D
202 area of the prism surface in which the surface astigmatism of the prism surface is between 4 and 6 D
204 area of the prism surface in which the surface astigmatism of the prism surface is larger than 6 D
206, 207 optically active areas of the prism surface
FIG. 14
208 area of the prism surface in which the refractive power change of the prism surface in the x direction is less than 0.7 D/mm
210 area of the prism surface in which the refractive power change of the prism surface in the x direction is between 0.7 D/mm and 1 D/mm
211, 212 optically relevant areas of the prism surface
FIG. 15
213 area of the prism surface in which the refractive power change in the y direction is less than 0.7 D/mm
214 area of the prism surface in which the refractive power change in the y direction is between 0.7 D/mm and 1 D/mm
216 area of the prism surface, in which the refractive power change in the y direction is larger than 1 D/mm
218, 219 optically relevant areas of the prism surface
FIG. 16
220 area of the prism surface in which the astigmatism change in the x direction is less than 0.5 D/mm
222 area of the prism surface in which the astigmatism change in the x direction is between 0.5 D/mm and 0.7 D/mm
224 area of the prism surface in which the astigmatism change in the x direction is larger than 0.7 D/mm
226, 227 optically relevant areas of the prism surface
FIG. 17
228 area of the prism surface in which the astigmatism change of the prism surface in the y direction is less than 0.5 D/mm
230 area of the prism surface in which the astigmatism change of the prism surface in the y direction is between 0.5 D/mm and 0.7 D/mm
232 area of the prism surface in which the astigmatism change of the prism surface in the y direction is larger than 0.7 D/mm
234, 235 optically relevant areas of the prism surface
FIG. 18
240 spectacle lens
242 prism portion
244 object-side surface of the spectacle lens
246 eye-side surface of the spectacle lens
248 eye-side surface of the major portion
250 eye-side surface of the prism portion
252 display
254 eye
FIGS. 19a, b
260 spectacles
262 spectacle lens
263 prism portion
264 object-side surface of the spectacle lens
266 eye-side surface of the spectacle lens
268 eye-side surface of the major portion
270 eye-side surface of the prism portion
272 spectacle frame
274 bridge portion
276, 278 spectacle side
280 display
282 side surface of the prism portion
284 object-side surface of the prism portion
286 pupil
288 eye
FIGS. 21a to 21c
310 spectacle lens
312 eye-side surface of the spectacle lens
314 eye-side surface of the major portion
316 eye-side surface of the prism portion
318 object-side surface of the prism portion
320 prism portion
322 display
324 bridge portion
326 spectacle frame FIG. 22
330 display
332 active surface of the display
FIGS. 24a to 24c
320 spectacle lens
342 prism portion
344 major portion
346 cutout
348 side surface of the prism portion
350 geometric center of the raw-round spectacle lens
FIG. 25
352 spectacle frame
354 display
356 spectacle lens
360 spectacles
FIG. 26
362, 364 spectacle lenses
366 spectacle lens receiving portion
368 prism receiving portion
370 display
372, 374 spectacle side
FIG. 27
380 spectacles
382, 384 spectacle lenses
386 prism portion
388 display
390, 392 spectacle side

The invention claimed is:

1. A spectacle lens with a first and an opposite second surface, wherein
at least the first surface of the spectacle lens has a major portion zone and
at least one prism zone;
the major portion zone of the first surface forms a major portion of the spectacle lens together with the opposite second surface of the spectacle lens, which major portion is designed for vision in at least one predetermined distance; and
the prism zone of the first surface forms a prism portion together with the opposite second surface of the spectacle lens, which prism portion is designed and arranged so as to form an optical image of a display in a predetermined virtual distance in front of the eyes of a wearer of the spectacle lens.

2. The spectacle lens according to claim 1, wherein the prism portion is arranged and designed such that, in a predetermined position of wear of the spectacle lens in front of the eyes of the wearer, at least one light ray coming from the display, after deflection on a side surface of the spectacle lens in the prism portion, is at least once reflected on an eye-side surface of the prism portion by means of total reflection in a direction of an object-side surface of the prism portion, subsequently reflected on the object-side surface in a direction of the eye-side surface, and imaged in the eye of the wearer through the eye-side surface of the prism portion.

3. The spectacle lens according to claim 1, wherein in at least one of a horizontal and vertical direction, the first surface in the prism zone is at least once continuously differentiably adjoining the first surface in the major portion zone.

4. The spectacle lens according to claim 1, wherein in at least one of a horizontal and vertical direction, the first surface in the prism zone is adjoining the first surface in the major portion zone by forming a bend.

5. The spectacle lens according to claim 1, wherein the first surface is a free-form surface in the prism zone and a spherical, rotationally symmetric aspherical, toric, atoric or progressive surface in the major portion zone.

6. The spectacle lens according to claim 5, wherein at least one of:
a maximum increase of a surface refractive power of the first surface in at least one of a horizontal and vertical direction is 2 D/mm; and
a maximum increase of a surface astigmatism of the first surface in at least one of the horizontal and the vertical direction is 1.4 D/mm.

7. The spectacle lens according to claim 5, wherein at a transition between the prism zone and the major portion zone, at least one of:
an angle between a horizontal component of a surface normal of the first surface in the prism zone and a horizontal component of a surface normal of the first surface in the major portion zone is less than 5°; and
an angle between a vertical component of the surface normal of the first surface in the prism zone and a vertical component of the surface normal of the first surface in the major portion zone is less than 5°.

8. The spectacle lens according to claim 1, wherein the first surface is a spherical surface in the prism zone and a spherical, rotationally symmetric aspherical, toric, atoric or progressive surface in the major portion zone.

9. The spectacle lens according to claim 8, wherein the first surface is a spherical surface with a first curvature in the prism zone and a spherical surface with a second curvature smaller than the first curvature in the major portion zone.

10. The spectacle lens according to claim 8, wherein at a transition between the major portion zone and the prism zone, at least one of:
an angle between a horizontal component of a surface normal of the first surface in the prism zone and a horizontal component of a surface normal of the first surface in the major portion zone is less than 45°, and
an angle between a vertical component of the surface normal of the first surface in the prism zone and a vertical component of the surface normal of the first surface in the major portion zone is less than 45°.

11. The spectacle lens according to claim 1, wherein the opposite second surface of the spectacle lens is a spherical, rotationally symmetric aspherical, toric, atoric or progressive surface extending across the major portion and the prism portion.

12. The spectacle lens according to claim 1, wherein the opposite second surface has a major portion zone and a prism zone, and the opposite second surface is a free-form surface in the prism zone and a spherical, rotationally symmetric aspherical, toric, atoric or progressive surface in the major portion zone.

13. The spectacle lens according to claim 1, wherein the opposite second surface has a major portion zone and a prism zone, and the opposite second surface is a spherical surface in the prism zone and a spherical, rotationally symmetric aspherical, toric, atoric or progressive surface in the major portion zone.

14. The spectacle lens according to claim 13, wherein the opposite second surface is a spherical surface with a first curvature in the prism zone and a spherical surface with a second curvature smaller than the first curvature in the major portion zone.

15. The spectacle lens according to claim 12, wherein in at least one of a horizontal and vertical direction, the opposite second surface in the prism zone is at least once continuously differentiably adjoining the opposite second surface in the major portion zone.

16. The spectacle lens according to claim 12, wherein in at least one of a horizontal and vertical direction, the opposite second surface in the prism zone is adjoining the opposite second surface of the spectacle lens in the major portion zone by forming a bend.

17. The spectacle lens according to claim 1, wherein the prism portion is arranged in at least one of a horizontally and vertically displaced manner with respect to a fitting point or a geometric center of the spectacle lens, wherein
at least one of a horizontal and vertical distance between the prism portion and at least one of the fitting point or the geometric center of the spectacle lens is 5 to 35 mm.

18. The spectacle lens according to claim 1, wherein the prism portion is arranged and designed such that it lies outside a field of sight for indirect vision in a zero direction of sight, wherein the prism portion is configured such that in the case of at least one of (i) a sight deviation with respect to the zero direction of sight of 25° to 45° in the horizontal direction, and (ii) a sight deviation of up to 40° in a vertical direction, a visual axis is parallel to a surface normal of the first or the opposite second surface of the spectacle lens in the prism zone.

19. The spectacle lens according to claim 1, wherein at least one of the first and/or opposite second surface of the prism portion is/are calculated depending on individual parameters of the wearer.

20. The spectacle lens according to claim 1, wherein a fully reflecting or semi-permeable reflection layer is coated on an eye-side surface in the prism zone.

21. The spectacle lens according to claim 1, wherein a side surface of the spectacle lens in an area of the prism portion is a plane surface.

22. The spectacle lens according to claim 1, wherein the first surface is an eye-side surface of the spectacle lens.

23. The spectacle lens according to claim 1, wherein the first surface is an object-side surface of the spectacle lens.

24. Spectacles for coupling data in and out, having at least one spectacle lens according to claim 1.

25. The spectacles according to claim 24, comprising at least one display arranged and designed such that, in a predetermined position of wear of the spectacle lens in front of the eyes of a spectacle wearer, at least one light ray coming from the display, after deflection on a side surface of the spectacle lens in the prism portion, is at least once reflected on an eye-side surface of the prism portion by means of total reflection in a direction of an object-side surface of the prism portion, subsequently reflected on the object-side surface in a direction of the eye-side surface, and imaged in the eye of the spectacle wearer through the eye-side surface of the prism portion.

26. The spectacles according to claim 25, wherein the display is integrated in a spectacle frame, preferably in a spectacle side or in a bridge portion of the spectacle frame.

27. The spectacles according to claim 25, wherein the spectacles further comprise at least one of:
a power source preferably integrated in the spectacle frame; and
a driving device for driving the display, wherein the driving device is preferably integrated in a spectacle frame.

28. The spectacles according to claim 24, wherein the spectacles are an autarkic system.

29. A method of using spectacles according to claim 24, comprising arranging the spectacle in a predetermined average or individual position of wear of the spectacle lens in front of the eyes of the spectacle wearer, for coupling data in and/or out.

30. A display apparatus comprising:
spectacles with at least one spectacle lens according to claim 1;
a display arranged in a spectacle frame of the spectacles.

31. The display apparatus according to claim 30, further comprising at least one of:
a power source preferably integrated in the spectacle frame; and
a driving device for driving the display, wherein the driving device is preferably integrated in the spectacle frame.

32. A method of using of a spectacle lens according to claim 1, comprising arranging the spectacle lens in a predetermined average or individual position of wear of the spectacle lens in front of the eyes of a spectacle wearer, for coupling data in and/or out.

33. A method for calculating or optimizing a spectacle lens, comprising
specifying a major portion zone and a prism zone of a first surface, and
calculating or optimizing the first surface such that the first surface in the major portion zone forms a major portion of the spectacle lens together with an opposite second surface of the spectacle lens, which major portion is designed for vision in at least one predetermined distance; and
the first surface in the prism zone forms a prism portion together with the opposite second surface of the spectacle lens, which prism portion is designed and arranged so as to form an optical image of a display in a predetermined virtual distance in front of the eyes of a wearer of the spectacle lens.

34. The method according to claim 33, wherein the calculation or optimization of at least one of the first and the opposite second surface of the spectacle lens in the prism zone is performed such that, in a predetermined position of wear of the spectacle lens in front of the eyes of a spectacle wearer, at least one light ray coming from the display, after deflection on a side surface of the spectacle lens in the prism portion, is at least once reflected on an eye-side surface of the prism portion by means of total reflection in a direction of an object-side surface of the prism portion, subsequently reflected on the object-side surface in a direction of the eye-side surface, and imaged in the eye of the wearer through the eye-side surface of the prism portion.

35. The method according to claim 33, wherein the calculating or optimizing step is performed taking individual data of the wearer into account.

36. The method according to claim 33, further comprising a step of obtaining target data of the spectacle lens, wherein the target data of the spectacle lens comprises at least one of data relating to the to-be-obtained dioptric power or prescription power of the major portion, and data relating to deflection of light rays coming from the display.

37. The method according to claim 33, wherein the calculation or optimization of the first surface is performed such that in at least one of a horizontal and vertical direction, the first surface in the prism zone is at least once continuously differentiably adjoining the first surface in the major portion zone.

38. The method according to claim 33, wherein the calculation or optimization of the first surface is performed such that in at least one of a horizontal and vertical direction, the first surface in the prism zone is adjoining the first surface in the major portion zone by forming a bend.

39. The method according to claim 33, wherein the first surface is a free-form surface in the prism zone and a spherical, rotationally symmetric aspherical, toric, atoric or progressive surface in the major portion zone.

40. The method according to claim 39, wherein the calculation or optimization of the first surface is performed such that at least one of:
- a maximum increase in a surface refractive power of the first surface in at least one of a horizontal and vertical direction is 2 D/mm; and
- a maximum increase in a surface astigmatism of the first surface in at least one of the horizontal and the vertical direction is 1.4 D/mm.

41. The method according to claim 40, wherein the calculation or optimization of the first surface is performed such that at least one of:
- an angle between a horizontal component of a surface normal of the first surface in the prism zone and a horizontal component of a surface normal of the first surface in the major portion zone is less than 5°; and
- an angle between a vertical component of a surface normal of the first surface in the prism zone and a vertical component of the surface normal of the first surface in the major portion zone is less than 5°.

42. The method according to claim 33, wherein the first surface is a spherical surface in the prism zone and a spherical, rotationally symmetric aspherical, toric, atoric or progressive surface in the major portion zone.

43. The method according to claim 42, wherein the first surface is a spherical surface with a first curvature in the prism zone and a spherical surface with a second curvature smaller than the first curvature in the major portion zone.

44. The method according to claim 42, wherein the calculation or optimization of the first surface is performed such that at a transition between the major portion zone and the prism zone, at least one of:
- an angle between a horizontal component of a surface normal of the first surface in the prism zone and a horizontal component of a surface normal of the first surface in the major portion zone is less than 45°, and
- an angle between a vertical component of a surface normal of the first surface in the prism zone and a vertical component of the surface normal of the first surface in the major portion zone is less than 45°.

45. The method according to claim 33, further comprising a step of calculating or optimizing the opposite second surface of the spectacle lens, wherein the optimization is preferably performed taking individual data of the wearer into account.

46. The method according to claim 33, wherein the opposite second surface is a spherical, rotationally symmetric aspherical, toric, atoric or progressive surface extending across the major portion and the prism portion.

47. The method according to claim 33, wherein the opposite second surface has a major portion zone and at least one prism zone, and the opposite second surface is a free-form surface in the prism zone and a spherical, rotationally symmetric aspherical, toric, atoric or progressive surface in the major portion zone.

48. The method according to claim 47, wherein the calculation of the second surface is performed such that in at least one of a horizontal and vertical direction, the opposite second surface in the prism zone is at least once continuously differentiably adjoining the opposite second surface in the major portion zone.

49. The method according to claim 33, wherein the opposite second surface has a major portion zone and at least one prism zone, and the opposite second surface is a spherical surface in the prism zone and a spherical, rotationally symmetric aspherical, toric, atoric or progressive surface in the major portion zone.

50. The method according to claim 49, wherein the opposite second surface is a spherical surface with a first curvature in the prism zone and a spherical surface with a second curvature smaller than the first curvature in the major portion zone.

51. The method according to claim 49, wherein the calculation of the opposite second surface in the prism zone is performed such that in at least one of a horizontal and vertical direction, the opposite second surface in the prism zone is adjoining the opposite second surface in the major portion zone by forming a bend.

52. The method according to claim 33, wherein the prism portion is arranged in at least one of a horizontally and vertically displaced manner with respect to a fitting point or a geometric center of the spectacle lens.

53. The method according to claim 33, wherein the calculation or optimization of the spectacle lens is performed such that in a predetermined position of wear of the spectacle lens,
- the prism portion is outside a field of sight of the wearer in indirect vision in a zero direction of sight; and
- upon at least one of (i) a sight deviation at a predetermined angle from 25° to 45° in a horizontal direction, and (ii) a sight deviation at a predetermined angle of up to 40° in a vertical direction, a visual axis is parallel to the first or the opposite second surface of the spectacle lens in the prism zone.

54. The method according to claim 33, wherein the prism portion is arranged in at least one of a horizontally and vertically displaced manner with respect to a fitting point or a geometric center of the spectacle lens, wherein
- at least one of a horizontal and vertical distance between the prism portion and at least one of the fitting point or the geometric center of the spectacle lens is 5 to 35 mm.

55. A method for producing a spectacle lens, comprising the following steps:
- providing surface data of the spectacle lens, wherein the spectacle lens is calculated or optimized according to the method according to claim 33;
- fabricating the spectacle lens according to the provided surface data of the spectacle lens.

56. The method according to claim 55, comprising a step of coating a preferably semi-permeable reflection layer on a eye-side surface of the spectacle lens in an area of the prism portion.

57. The method according to claim 55, wherein the fabrication of the spectacle lens comprises the following steps;
- providing a main body,
- providing a prism body
- connecting the main body and the prism body; and
- finishing the main body with the connected prism body, so that the spectacle lens has target data, wherein the target data of the spectacle lens comprises at least one of data relating to the to-be-obtained dioptric power or prescription power of the major portion, and data relating to deflection of light rays coming from the display.

58. The method according to claim 57, wherein the connection of the prism body with the main body is achieved by melting or gluing in.

59. The method according to claim 57, wherein the main body is provided with a recess for receiving the prism body.

60. An apparatus for calculating or optimizing a spectacle lens, wherein the apparatus comprises:
- calculating and optimizing means for calculating and optimizing at least one surface of the spectacle lens, wherein the calculating and optimizing means are designed and arranged so as to perform the method for calculating or optimizing the spectacle lens according to claim 33.

61. The apparatus according to claim 60, further comprising obtaining means for obtaining target data of the spectacle lens, wherein the target data of the spectacle lens comprises at least one of data relating to the to-be-obtained dioptric power or prescription power of the major portion, and data relating to the deflection of light rays coming from the display.

62. A machine-readable computer program product having program portions that are adapted, when loaded and executed on a computer, to perform a method for calculating or optimizing a spectacle lens according to claim 33.

63. A storage medium with a computer program stored thereon, wherein the computer program is adapted, when loaded and executed on a computer, to perform a method for optimizing a spectacle lens according to claim 33.

64. An apparatus for producing a spectacle lens, comprising
- calculating and optimizing means for calculating or optimizing at least one surface of the spectacle lens, wherein the calculating and optimizing means are designed and arranged so as to perform a method for calculating or optimizing the spectacle lens according to claim 33;
- machining means for machining the optimized spectacle lens.

* * * * *